United States Patent
Johansson et al.

(10) Patent No.: US 12,283,040 B2
(45) Date of Patent: Apr. 22, 2025

(54) MINING EQUIPMENT INSPECTION SYSTEM, MINING EQUIPMENT INSPECTION METHOD, AND MINING EQUIPMENT INSPECTION DEVICE

(71) Applicant: Metso Outotec Finland Oy, Tampere (FI)

(72) Inventors: Fredrik Johansson, Skellefteå (SE); Håkan Ståhlbröst, Skellefteå (SE); Lars Furtenbach, Skellefteå (SE); Johanna Fahlgren, Kåge (SE); Lotta Kågström, Skellefteå (SE); Magnus J. Eriksson, Kåge (SE); Jhino Silva, Lima (PE); Victor Wesly Ruiz, Lima (PE)

(73) Assignee: Metso Outotec Finland Oy, Tampere (FI)

( * ) Notice: Subject to any disclaimer, the term of this patent is extended or adjusted under 35 U.S.C. 154(b) by 398 days.

(21) Appl. No.: 17/761,364

(22) PCT Filed: Jun. 30, 2020

(86) PCT No.: PCT/EP2020/068393
§ 371 (c)(1),
(2) Date: Mar. 17, 2022

(87) PCT Pub. No.: WO2021/052645
PCT Pub. Date: Mar. 25, 2021

(65) Prior Publication Data
US 2022/0351353 A1 Nov. 3, 2022

(30) Foreign Application Priority Data
Sep. 20, 2019 (SE) .................................. 1951064-3

(51) Int. Cl.
*G06T 7/33* (2017.01)
*B02C 17/18* (2006.01)
*G06T 7/00* (2017.01)

(52) U.S. Cl.
CPC .............. *G06T 7/001* (2013.01); *B02C 17/18* (2013.01); *G06T 7/33* (2017.01); *G06T 2207/10028* (2013.01)

(58) Field of Classification Search
CPC . G06T 7/001; G06T 7/33; G06T 2207/10028; G06T 2207/30164;
(Continued)

(56) References Cited

U.S. PATENT DOCUMENTS

| 10,410,331 B2 | 9/2019 | Jimenz, Jr. |
| 2010/0131234 A1* | 5/2010 | Stewart ................. B02C 4/32 |
| | | 702/179 |

(Continued)

FOREIGN PATENT DOCUMENTS

| AU | 2012202036 A1 | 5/2012 |
| AU | 2016200024 A1 | 1/2016 |

(Continued)

OTHER PUBLICATIONS

Examination Report for Australian Application No. 2020350055 mailed Feb. 1, 2023.
(Continued)

*Primary Examiner* — Mohammed H Zuberi
*Assistant Examiner* — Ahamed I Nazar
(74) *Attorney, Agent, or Firm* — Andrus Intellectual Property Law, LLP

(57) ABSTRACT

A computer-implemented point-cloud data acquisitioning method for acquiring point-cloud data of the inside of a mining equipment. The method includes the step of acquiring from a sensor, a first dataset and a second dataset,
(Continued)

wherein each dataset includes datapoints at coordinates. The method extracts features from the first and second dataset and aligns the first and second dataset using the extracted features. The first and second dataset are aligned into a point-cloud data. The geometry of the mining equipment is estimated based on the point-cloud data and the point-cloud data is used to identify a region of the estimated geometry indicating insufficient data.

34 Claims, 12 Drawing Sheets

(58) Field of Classification Search
CPC ......... G06T 17/00; B02C 17/18; B02C 17/00; B02C 17/22; G01B 11/30; G01B 21/30
USPC .......................................................... 382/154
See application file for complete search history.

(56) References Cited

U.S. PATENT DOCUMENTS

| | | | | |
|---|---|---|---|---|
| 2010/0194856 | A1* | 8/2010 | Varekamp | H04N 13/128 348/42 |
| 2013/0231892 | A1* | 9/2013 | Franke | G01B 11/24 702/170 |
| 2016/0365224 | A1* | 12/2016 | Potocek | G01N 1/286 |
| 2017/0046829 | A1 | 2/2017 | Hovland | |
| 2017/0191823 | A1 | 7/2017 | Yokota | |
| 2018/0128598 | A9 | 5/2018 | Stewart et al. | |
| 2022/0244056 | A1* | 8/2022 | Klingner | G01C 21/32 |

FOREIGN PATENT DOCUMENTS

| | | |
|---|---|---|
| CN | 106845502 A | 6/2017 |
| EP | 0846840 A2 | 6/1998 |
| EP | 3428571 A1 | 1/2019 |
| WO | 2018134614 A1 | 7/2018 |

OTHER PUBLICATIONS

Office Action for Russian Patent Application No. 2022107409/28, dated Oct. 9, 2023.
Holz et al. "Registration With the Point Cloud Library: A Modular Framework for Aligning in 3-D", IEEE Robotics & Automation Magazine, vol. 22, No. 4, pp. 110-124, IEE Service Center, Piscataway, NJ, US, published Dec. 1, 2015.
Kirshnamurthy et al. "Fitting Smooth Surfaces to Dense Polygon Meshes", Computer Graphics Proceedings, pp. 313-324, Siggraph '96, ACM, New York, US, published Aug. 1, 1996.
Bellekens et al. "A Benchmark Survey of Rigid 3D Point Cloud Registration Algorithms", International Journal on Advances in Intelligent Systems, pp. 118-127, published Jan. 1, 2015, retrieved from https://www.thinkmind.org/articles/intsys_v8_n12_2015_10_.pdf.
Ali et al. "Part Design and Evaluation Through Reverse Engineering Approach", Proceedings of the 2008 IAJC-IJME International Conference, published Jan. 1, 2008.
Yiu Ip et al. "Retrieving Matching CAD Models by Using Partial 3D Point Clouds", Computer-Aided Design and Applications, vol. 4, No. 5, pp. 629-638, published Jan. 1, 2007.
Papachristos et al. "Augmented Reality-Enhanced Structural Inspection Using Aerial Robots", pp. 1-6, 2016 IEEE International Symposium on Intellegent Control (ISIC), IEEE, published Sep. 19, 2016.
"Virtual Inspection", IP.com, IP.com Inc., West Henrietta, New York, published Sep. 4, 2010.
Olbrich et al. "Augmented Reality Pipe Layout Planning in the Shipbuilding Industry", pp. 269-270, 2011 IEEE International Symposium on Mixed and Augmented Reality (ISMAR), published Oct. 26, 2011.
Veronez et al. "Imspector: Immersive System of Inspection of Bridges/Viaducts", pp. 1203-1204, 2019 IEEE Conference on Virtual Reality and 3D User Interfaces (VR), IEEE, published Mar. 23, 2019.
Germani et al. "Automation of 3D View Acquisition for Geometric Tolerances Verification", pp. 1710-1717, 2009 IEEE 12th International Conference on Computer Vision Workshops, ICCV Workshops, Kyoto, 2009.
Karganroudi et al. "What-If Scenarious Towards Virtual Assembly-State Mounting for Non-Rigid Parts Inspection Using Permissible Loads".
International Search Report for PCT Application No. PCT/EP2020/068393, mailed Dec. 14, 2020.
International Preliminary Report on Patentability for PCT Application No. PCT/EP2020/068393, mailed Mar. 15, 2022.
Search Report for Swedish Application No. 1951064-3, mailed Mar. 12, 2020.
Office Action for Canadian Patent Application No. 3,155,070, mailed Dec. 11, 2023.
Communication pursuant to article 94(3) EPC for European Patent Application No. 20743966.2, dated Oct. 24, 2024.
Anonymous WI: "Oil Fields—Safe Drinking Water Foundation", Jan. 23, 2017 (Jan. 23, 2017), pp. 1-12, XP093216462, Retrieved from the Internet: URL: https://www .safewater.org/fact-sheets-1/2017/1/23/oil-fields.
Examination Report for Australian Patent Application No. 2024200608, dated Nov. 29, 2024.
Curless, B., et al., 'A volumetric method for building complex models from range images', Proceedings of the 23rd annual conference on Computer graphics and interactive techniques. 1996 <URL: https://dl.acm.org/doi/pdf/10.1145/237170.237269>.

* cited by examiner

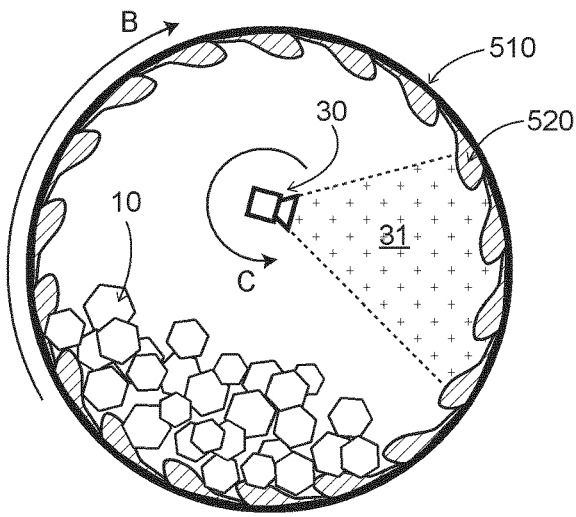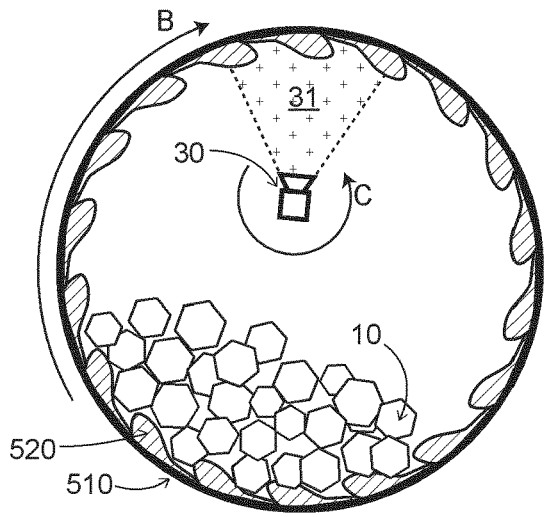
FIG. 4A  FIG. 4B
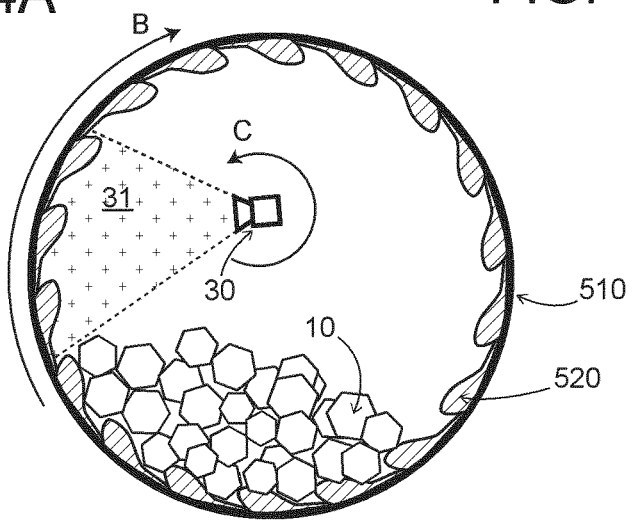
FIG. 4C
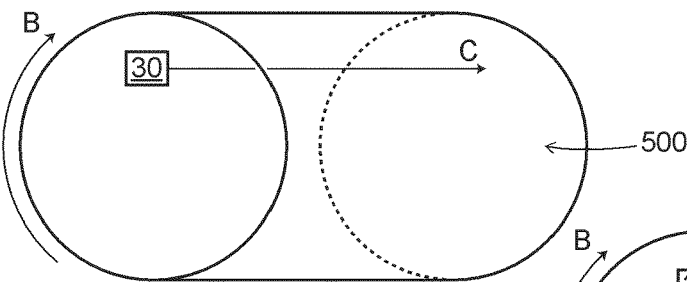
FIG. 4D
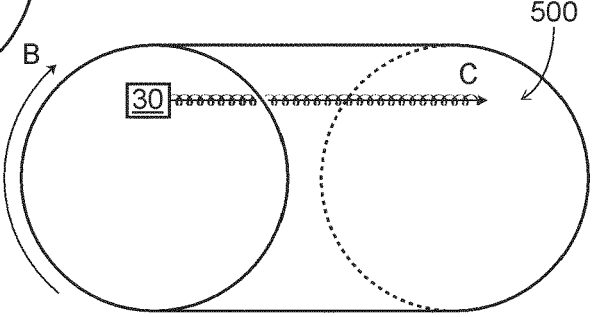
FIG. 4E

MINING EQUIPMENT INSPECTION SYSTEM, MINING EQUIPMENT INSPECTION METHOD, AND MINING EQUIPMENT INSPECTION DEVICE

CROSS-REFERENCE TO RELATED APPLICATIONS

This application is the U.S. national stage application of International Application PCT/EP2020/068393, filed Jun. 30, 2020, which international application was published on Mar. 25, 2021, as International Publication WO 2021/052645 A1 in the English language. The International Application claims priority of Swedish Patent Application No. 1951064-3 filed Sep. 20, 2019.

FIELD OF THE INVENTION

The present invention generally relates to systems, methods and devices for inspecting mining equipment. Examples of mining equipment are a mill, a crusher, a grinder. Also, the present invention relates to systems, methods and devices for a virtual inspection of mining equipment.

TECHNICAL BACKGROUND

Mining equipment such as a horizontal or vertical mill, a crusher or grinder, is used for reducing the size of mining materials such as minerals or ore, by a mining process such as milling, crushing or grinding. The mining process typically applies stress forces to the mining material until it breaks into smaller pieces. Metal objects such as rods or balls, may be placed into the mining equipment to aid the mining process. Further, the mining equipment may perform dry or wet mining processing, wherein the wet mining process provides better efficiency and suppresses dusting. However, during the mining process (especially the wet mining processing), the mining equipment and metal objects will wear down.

To protect the mining equipment from excessive wear, a liner may be installed on surfaces of the mining equipment. This liner may be made from ceramic, rubber, polymer or composite material and is typically installed in such a way that it can be replaced, e.g. by use of screws, latches or hocks, when reaching its end of life. The liner may be shaped in such a way, that it supports the mining process and or material discharge, e.g. by having protrusions and recesses that function as shovels. Regular inspections are necessary to assess wear and/or damage of the liner and determine whether the liner needs replacement.

However, to perform the inspection, inspection staff, e.g. a specialist, needs to enter a hostile environment, e.g. the room or space inside the mining equipment, or a space close to where the mining process takes place. To lower the possibility of harming the inspection staff during inspection, two safety precautions are typically followed. Firstly, the mining equipment is powered down and decontaminated, and is then inspected during its down-time, i.e. when the mining equipment is not operating, i.e. not performing any mining process. Secondly, the inspection should be performed as quickly as possible to minimize down-time and, more importantly, reduce the duration of exposing inspection staff to the hostile environment. Once the inspection is concluded, operation may commence, and data obtained during the inspection may be analyzed to determine the wear status of the mining equipment as well as its liner and discharge system.

PRIOR ART

AU 2016 200024 A1 relates to a system and method for monitoring the condition of surface wear of mining equipment. Herein, surfaces are measured and compared against historical data to determine whether the surface (e.g. of a liner) needs repair or replacement. The measurement is performed on a powered-down (and possibly decontaminated) mining equipment, by use of a scanner that sweeps around a horizontal and vertical axis to generate 3D point cloud data. The scanner is attached to the end of a rod, beam or boom inserted into the mining equipment or mounted on top of a tripod that is placed inside the mining equipment. Herein, the idea is to fixedly and rigidly attach the sensor to prevent it from changing its position inside the mining equipment when performing the scan. However, because the scanner used herein remains stationary, part of the surface that is to be inspected may still be covered by mining material, e.g. crushed ore, or other residues, e.g. slurry. Further, AU 2016 200024 A1 intends to scan all of the surface by positioning the scanner as close as possible to the center of the mining equipment. However, an uneven surface, e.g. with protrusions, may result in scanning-shadows, where part of the to be scanned surface is obstructed by said protrusions. In addition to the mining material and other residue present in the mining equipment during scanning, these scanning-shadows further deteriorate the quality and completeness of the point cloud data used for analysis and inspection.

Technical Problem

Following the above, there is a technical problem of how to acquire sufficient and complete data of the mining equipment during inspection, whilst minimizing the duration of the inspection.

Further, there is a technical problem of how to improve the inspection to identify specific points of interest of the inside of the mining equipment and to improve notifying about these points of interest.

Further, since a freshly halted mining equipment may still contain mining material such as minerals, ore or slurry, parts of the structure or a surface of the mining equipment may be covered by the mining material, preventing them from being inspected. Traditionally, the mining equipment must be cleaned, e.g. emptied and decontaminated, and halted for inspection, which further extends the duration of the inspection. Therefore, a further technical problem is to avoid or at least mitigate the necessity of emptying, decontamination and/or powering down the mining equipment.

SOLUTION

The present invention according to the independent claims solves this technical problem. The subject-matter of the dependent claims describes further preferred embodiments.

Advantageous Effects

The systems, methods and devices according to the subject-matter of the independent claims improve the performing of inspecting mining equipment. More specifically, the duration of the inspection is kept short, improving safety of inspection staff and reducing mining equipment down-time. Further, data acquisition during inspection is performed in such a way, that the dataset is acquired during inspection is complete, thereby avoiding subsequent inspections. Further, inspection can be carried out without completely powering down the mining equipment, allowing a continued operation. In addition, the virtual inspection improves the identification of specific points of interest of the inside of the mining equipment, in particular by providing the virtual inspection to a plurality of on-site and remote users simultaneously inspecting the mining equipment.

DESCRIPTION OF THE DRAWINGS

FIG. 4A to 4E depict movement of a sensor when inspecting a tumbling mill that is in operation.

DETAILED DESCRIPTION

Example embodiments of the invention are now described in detail with reference to the accompanying figures. It is noted that the following description contains examples only and should not be construed as limiting the invention. In the following, similar or same reference signs indicate similar or same elements or functions.

[Mining Equipment]

In reference to FIG. 1A to 1D, functionality of different mining equipment is explained. Each mining equipment depicted in FIG. 1A to 1D is designed to reduce the size of mining material 10 to produce a smaller sized material or product 20.

Figure 1A:
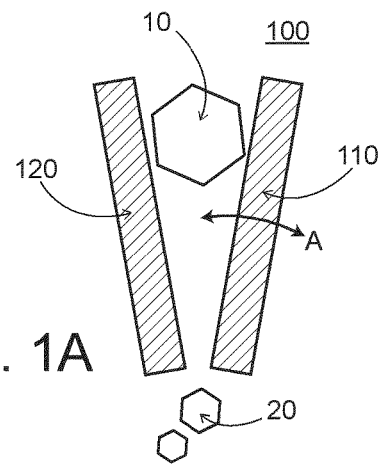
FIG. 1A to 1E depict examples of mining equipment.

FIG. 1A depicts a compression crusher 100 as a mining equipment. A jaw, gyrator or cone crusher may be such a compression crusher. Herein, the mining material 10 is compressed between a first surface 110 and a second surface 120. Herein either one or both surfaces may be moving in a direction A towards and away from each other, allowing mining material 10 to enter the space between the two surfaces and to be compressed and crushed. The resultant product 20 is ejected from the compression crusher 100 by gravity and by pressure of the mining material 10 inserted into the compression crusher 100. By controlling the amount of motion in the direction A, the size of the product 20 is adjusted. During operation, the surfaces 110 and 120 wear down and may therefore be protected by a liner.

Figure 1B:
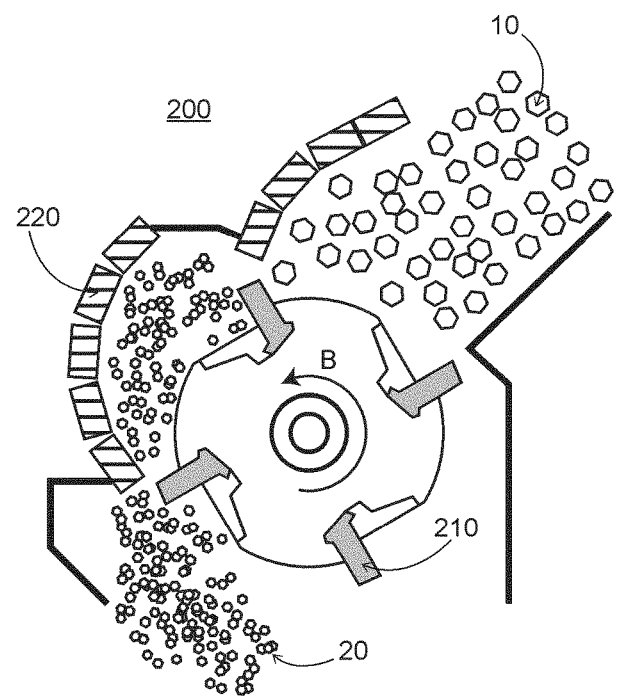

FIG. 1B depicts an impactor 200 as a mining equipment. Mining material 10 is fed into the impactor 200 and thrown against internal surfaces 220 of the impactor 200 by use of rotating shovels 210. In the example of FIG. 1B, the shovels 210 rotate in direction B. By impacting the mining material 10 against the internal surfaces 220, it is broken into smaller pieces, resulting in the product 20 that is ejected from the impactor 200. Whilst the impactor 200 depicted in FIG. 1B illustrates a horizontal type impactor seen from its side, a vertical type impactor is constructed similarly when seen from above. In a vertical type impactor, the internal surfaces 220 would then represent part of the peripheral walls. By moving the inside surfaces 220 closer to or further away from the rotating shovels 210, the size of the product 20 is adjusted. Since both the shovels 210 and the inside surfaces 210 wear down during operation, they may be covered or constructed out of a liner that can be replaced when necessary.

Figure 1C:
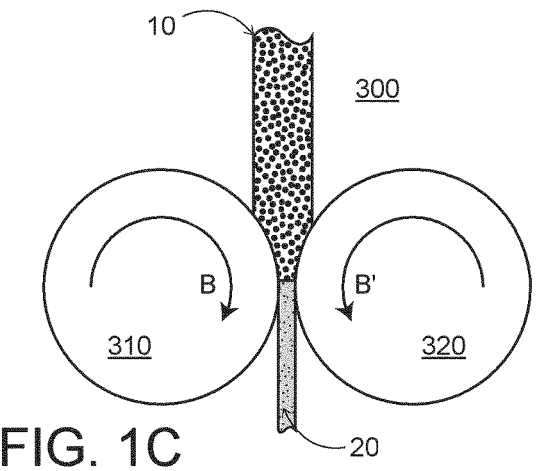

FIG. 1C depicts high pressure grinding rolls 300 as a mining equipment. Herein, a first roll 310 and a second roll 320 rotate in a first direction B and a second direction B', i.e. in opposite directions. Thereby, a mining material 10 is fed into the gap between the two rolls 310, 320 and reduced in size to result in the ejected product 20. By bringing the two rolls 310, 320 closer to or further away from each other, size of the product 20 is adjusted. To accommodate different mining materials 10 and to protect from wear, the rolls 310, 320 may be covered or constructed out of a liner.

Figure 1D:
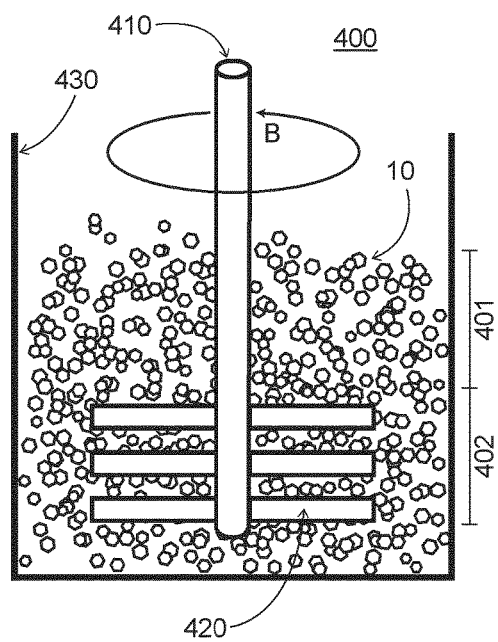

FIG. 1D depicts a stirred grinding mill 400 as a mining equipment. The stirred grinding mill 400 rotates a shaft 410 in a direction B, thereby rotating beams 420 that stir the mining material 10. This stirring reduces the size of the mining material 10 by impact, compression, shear and attrition forces between pieces of mining material 10. Since mining material 10 of different size and mass deposits or segregates at different heights inside the stirring vessel 430, the required product can be extracted at the appropriate height 401, 402 from stirring vessel 430. Sieving or filtering of the extracted product can further reduce the size variation of the extracted product. The inside surface of the stirring vessel 430 and the beams 420 wear down during operation. Therefore, they may also be covered by a liner.

Figure 1E:
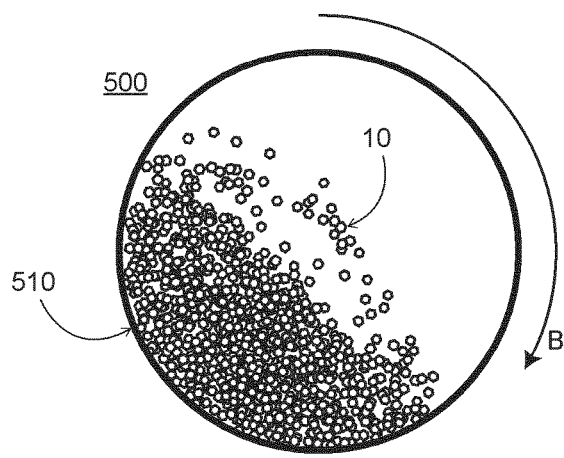

FIG. 1E depicts a tumbling grinding mill 500 as a mining equipment. To support the mining operation, rods or balls made from metal may be inserted in the tumbling grinding mill 500. The mining operation is performed by rotating the tumbling vessel 510 in a certain direction B. Thereby, mining material 10 is exposed to impact, compression, shear and attrition forces, thereby reducing its size. By use of a discharge structure (not depicted in FIG. 1E), the finished product of a predetermined size or a particular size distribution may be extracted from the tumbling vessel 510. To protect the inside surface of the tumbling vessel 510 during mining operation, a liner may be installed. Mining operation may even be supported by shaping the liner accordingly.

Other examples of mining equipment are a horizontal mill and a vertical mill.

In addition to the different types of crushers and mills outlined above, mining equipment may also comprise screening machines, conveyer belts, power lines, pipelines or flotation machines.

Screening machines receive granulated ore material and separate it into multiple grades by particle size. By applying the inspection methodology described below to screening machines, i.e. to acquire point-cloud data of the machines or at least part of the machines, assures their operation of separating ore material is maintained. Thereby, both the risk of damaging the screening machine itself (e.g. due to material wear, fatigue and failure) and of damaging other mining equipment (e.g. due to falsely screened material of incompatible particle size being introduced into subsequent mining equipment) is reduced.

Conveyer belts may be several kilometers long and serve the purpose of transferring mining material between mining equipment. By applying the inspection methodology described below, i.e. to acquire point-cloud data of conveyor belts or at least part of the conveyor belts assures they are operating properly. Instead of using a depth-analysis as will be described below for analyzing wear and deformation of mining equipment, a thermal sensor may measure the temperature of bearings and other moving components of a mining equipment, particularly a conveyer belt. Regions of the equipment indicating a temperature higher than average provide information e.g. of insufficient lubrication and/or extensive material wear, which will likely result in failure. A flying drone may be utilized to transport an inspection sensor along the mining equipment when searching for such regions. This avoids the need of inspection staff having to manually scan the mining equipment, which reduces health and safety risks and also improves scanning accuracy, since human error is reduced.

Power lines may be several kilometers long and serve the purpose of providing mining equipment with electric power for performing their mining operation. By applying the inspection methodology to acquire point-cloud data as described below to power lines, breaks, power loss and faults may be detected. Further, a thermal sensor may measure the temperature of the power lines and power equipment, including transformers, generators and power electronics equipment, to determine regions where the power lines or power equipment may overheat. These regions may indicate a short circuit, component degradation or equipment overload. A flying drone may be utilized to transport an inspection sensor along the power line and power equipment when searching for such regions. In addition, by using a depth-analysis similar to that described below, power line and power equipment deformation or damage may be inspected to assure operating standards and insulation standards are maintained.

Pipelines are used to move mining materials such as ores including coal or iron, or mining waste, called tailings, over long distances. These pipelines may be of several tens to hundreds of kilometers in length. By applying the inspection methodology described below to pipelines, deformation and wear producing a risk of a break and leakage may be detected. This detection allows preventive maintenance to be performed before failure of the pipeline and before the failure may cause damage to mining equipment connected to the pipeline. A flying drone may be utilized to transport a sensor along the pipeline when searching for regions of deformation and wear. This search may be extended to cover also pumps, filters, compressors or other pipeline equipment used in combination with the pipeline.

Flotation machines are for selectively separating hydrophobic materials from hydrophilic materials. By applying the inspection methodology described below to flotation machines, their operation is maintained, assuring that the outputted product is of a composition suitable for further processing.

[Data Acquisition]

To better illustrate and explain the embodiment(s) described herein, the tumbling grinding mill 500 and its geometry are used to explain the process of inspecting mining equipment. However, other types of mining equipment (as described above) may equally be used.

Figure 2A:
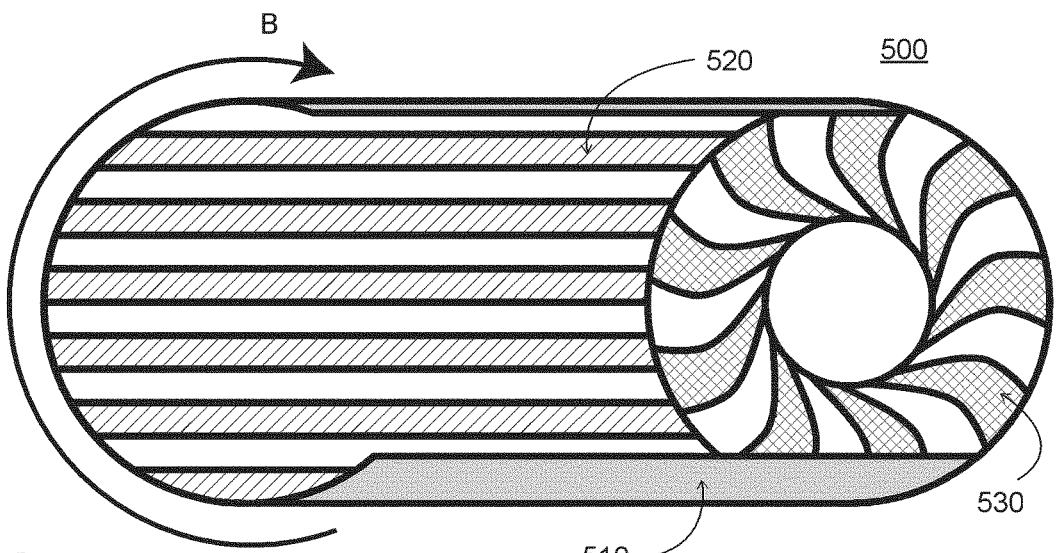
FIG. 2A to 2D depict a lined tumbling mill and datasets acquired for performing inspection of a tumbling mill.

FIG. 2A depicts a tumbling grinding mill 500 as a mining equipment that is cut open for illustrative purpose. The tumbling grinding mill 500 comprises a liner 520 with protrusion and/or recesses and a discharge system 530. During mining operation when the tumbling grinding mill is operating, the tumbling grinding mill 500 is rotated, e.g. in a direction B, to reduce the size of mining material 20 akin to the mining operation depicted in FIG. 1E.

In preparation for inspection, the tumbling grinding mill 500 is slowed down and halted, allowing inspection staff to enter a sensor 30 into the tumbling vessel 510 and begin the inspection. Inside the tumbling vessel 510, the sensor 30 (e.g. depth sensor, sensing the distance from the sensor to a surface as depth thus performing a depth-analysis) may be arranged to scan the inside surface of the tumbling grinding mill 500. Herein, the sensor 50 outputs datasets comprising datapoints 540* at corresponding coordinates.

The sensor 30 may be handheld, requiring the tumbling grinding mill 500 to be fully halted and decontaminated and/or cleaned before allowing the inspection staff may enter the tumbling vessel 510. Alternatively, the sensor 30 may be supported by a rod, a robot or flying drone entering the tumbling vessel 510. For this latter alternative, it may not be necessary to halt, decontaminate and/or empty the tumbling grinding mill 500. An inspection method for the latter option will be described later.

Figure 2B:
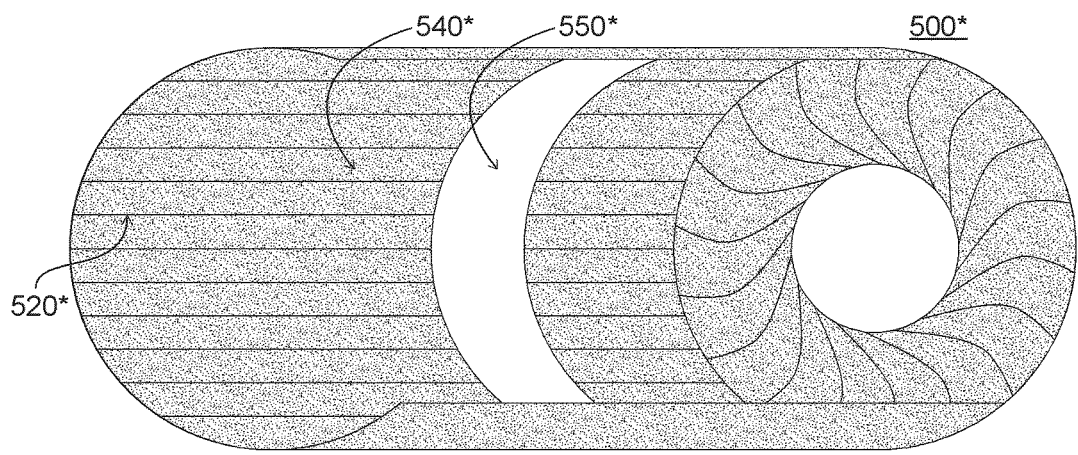

FIG. 2B depicts a point-cloud dataset comprising the datapoints 540* mentioned above, which may be represented and/or stored as coordinate vectors. The coordinate vector may be a three-dimensional vector in a cartesian coordinate system defining points in space related to the mining equipment (e.g. related to the position of a mining equipment's surface or liner). The skilled person understands that a distance between the sensor and the points of the mining equipment may be obtained from time-of-flight information using a laser or the like (depth information data). Alternatively, the coordinate vector may be a four-dimensional vector, wherein the first three values are a three-dimensional vector in a cartesian coordinate system (as just explained) and the fourth value is related to a reflection property from the scanned points of the mining equipment (e.g. an intensity of reflection of the sensor's laser light from a surface texture or a surface composition at the respective points of the mining equipment). Alternatively, or in addition, the forth value may be related to a thermal property from the scanned points of the mining equipment (e.g. a surface temperature measured by a thermal sensor used alongside the before-mentioned scanner).

For clearer illustration, the asterisk "*" added to some reference signs and used in the following description, indicates a data representation or a point-cloud representation of reality of the corresponding component. For example, reference 500* labels the point-cloud data of the mining equipment, reference 520* labels a feature of the point-cloud data 500*, reference 540* labels a datapoint of the point-cloud data 500* and reference 550* labels a region of insufficient data in the point-cloud data 500*.

Figure 2C:
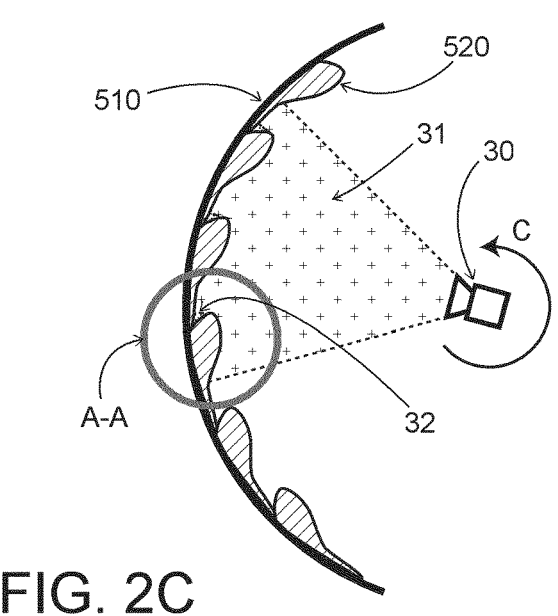
Figure 2D:
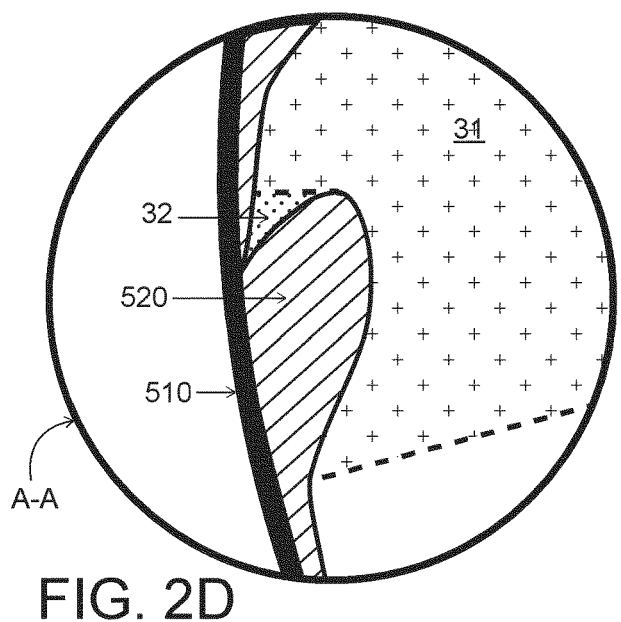

As indicated in FIG. 2C, the sensor 30 may have a limited scanning range 31 and may be prone to scanning shadows 32. Herein, scanning shadows 32 may be due to protrusions or recesses e.g. of the liner 520 blocking part of a surface that is to be scanned and that would be in the line of sight of the sensor 30, e.g. within the scanning range 31 of the sensor 30, were there no protrusion or recess. A magnification of such a scanning shadow 32 in section A-A of FIG. 2C is depicted in FIG. 2D for illustrative purpose. Surface information within such a scanning shadow may be reflected as a gap in the point-cloud data or missing/inaccurate data, which could result in an inaccurate analysis of the mining equipment. By the method explained below, a complete set of point-cloud data 500* of a mining equipment (e.g. the tumbling grinding mill 500) may be obtained for analysis, e.g. for wear and/or fault analysis, wherein the otherwise missing surface information is also obtained. Examples of forms of wear or faults obtained from such analysis comprise defects, porosity, cracks, voids, discontinuities, missing or faulty parts, corrosion, impact damage, detachment (e.g. of liner), and the like.

Figure 3A:
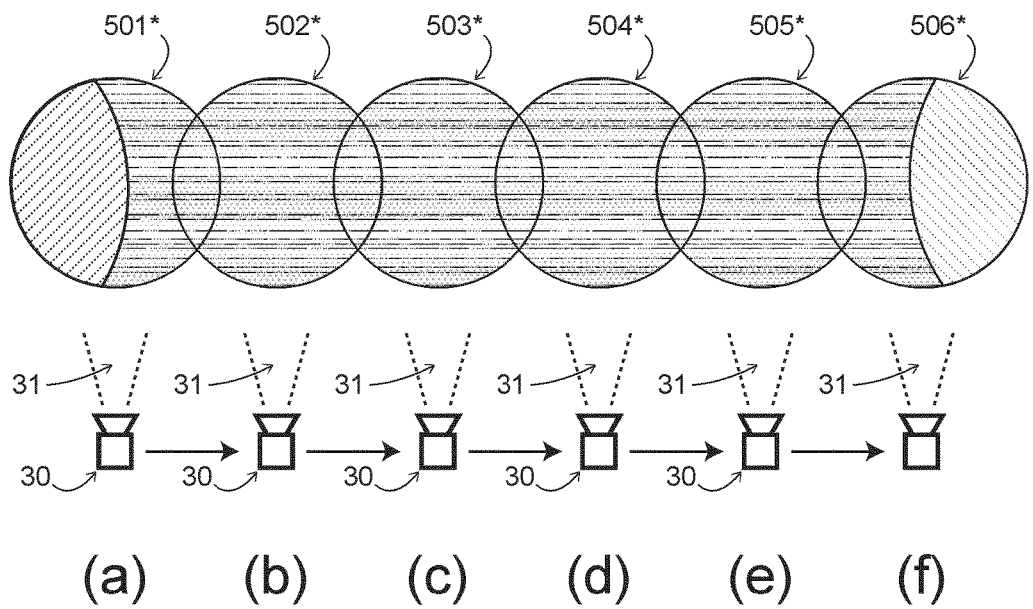
FIGS. 3A and 3B depicts the data acquisition process, the missing data identification process.

FIG. 3A depicts the data acquisition process for the method of acquiring a complete set of point-cloud data 500*. As shown in FIG. 3A, first a first dataset 501* and then a second dataset 502* are acquired by the sensor 30. Herein, each dataset comprises datapoints 540* at corresponding coordinates, e.g. on a surface of the mining equipment. The acquiring is performed by moving the sensor 30 relative to a surface of the tumbling vessel 510, inside the tumbling vessel 510, i.e. from position (a) to position (b) as illustrated in FIG. 3A.

Referring to FIG. 3A, letters (a) to (f) indicate different times and locations of the sensor 30 extending beyond the acquiring of the first and second dataset 501*, 502*. Herein, (a) to (f) indicate different positions of the sensor 30 inside the tumbling grinding mill 500 during scanning, when being moved (from left to right) essentially along the rotation axis of the tumbling grinding mill 500. The sensor 30 may also (or alternatively) be rotated, e.g. in direction C, as shown in FIG. 2C. Hence, moving the sensor 30 may include translational and/or rotational movement. Hence, the sensor 30 may be a movable sensor 30, preferably handheld, flying, hovering or suspended. In this regard, a flying drone, a rod or a robotic suspension device may be used for example. Also, since the sensor 30 progressively acquires the individual datasets 501*, . . . 506*, the second dataset 502* is acquired after the first dataset 501* and after the sensor 30 has been moved. Equally, the third dataset 503* is acquired after the second and first dataset 501*, 502* and after the sensor 30 has been moved, etc. This process of progressively acquiring datasets 501*, . . . 506* to produce the point-cloud data 500* is also referred to as "virtually painting" the inside of the mining equipment.

To produce the datasets 501*, . . . 506*, the sensor 30 may acquire information about a distance from the sensor 30 to a surface inside the mining equipment, e.g. the tumbling grinding mill 500, as depth information. Laser, radar, sonar, stereoscopic imaging, a "time-of-flight" sensor or the like or a combination thereof may be used to acquire said depth information. The data obtained by the sensor 30 may further comprise information related to surface texture or surface composition. For example, whilst the time-of-flight of the emitted signal and its reflection may indicate a distance to the measured surface, an intensity-related property of the reflected and measured signal may indicate the kind of material to which the distance is measured. Rubber may, for example, absorb more light from a laser-based scanner than a metal surface.

Further, the sensor 30 may obtain information about orientation and/or position (e.g. by use of odometry) of the sensor 30. Herein the information about orientation may include roll, pitch and/or yaw information of the sensor 30, and the information about position may include x, y and z information of the sensor 30. A gyroscope and accelerometer sampling at high frequencies, e.g. at least 100 Hz, may be used for obtaining the orientation and change in position. Since information about position and orientation of the sensor 30 are thereby known, and since depth information is acquired, too, corresponding coordinates of datapoints 540* representing the scanned surface can be derived as the acquired datasets 501*, . . . 506*. Hence, the datapoints 540* include coordinates indicating a location of a surface sensed by the sensor 30. The point-cloud data 500* is used for analysis since it is a set of datapoints 540* each representing location information or a location-intensity information of a point on a surface inside of the mining equipment 500* as mentioned above. Thereby each datapoint 540* represents information of the inside surface structure of the mining equipment 500.

However, since the scanning range 31 may limit the size of each dataset 501*, . . . 506* acquired by the sensor 30, and since the position and location of the sensor 30 may not be tracked with perfect accuracy, the datasets 501*, . . . 506* may need to be combined or "stitched" together to produce the point-cloud data 500* representing the structure of the inside of the tumbling grinding mill 500, that is needed for analysis. As described below, positioning and aligning of each dataset 501*, . . . 506* is performed first, before combining them into the point-cloud data 500* used for analysis.

Returning to the generating of the point-cloud data 500* depicted in FIG. 2B, the combining of the datasets 501*, 502* is performed as follows. After having acquired the two datasets 501*, 502*, features 520* are extracted from the first and second dataset 501*, 502*. Herein, features 520* may represent markers, edges, surface structure patterns and/or surface reflectivity pattern of the scanned surfaces, and are illustrated by a dotted surface in FIG. 2B for simplicity. That is, the combination of datasets may be performed on the basis of positional or structural features and/or reflection property features.

Although the first and second dataset 501*, 502* may have already been roughly aligned during the scanning process described above, discrepancies due to discontinuous or erroneous sampling of orientation and position information (e.g. due to integration errors) still need to be corrected. Further, if either or both orientation and position information cannot be obtained, positioning and alignment of the datasets 501*, 502* cannot be achieved during the scanning process described above and may need to be performed differently. Hence, the first and second dataset 501*, 502* are positioned and aligned using the extracted features 520* and combined into the point-cloud data 500*. More specifically, when part of the scanned surface is represented by both datasets 501*, 502* (e.g. where the datasets 501*, 502* overlap as shown in FIG. 3A), the datasets 501*, 502* may be scaled, translated and/or rotated to superimpose their corresponding features 520* until they are correctly positioned and aligned. Thereby, positioning and alignment of the two datasets 501*, 502* is achieved and/or improved before combining them into the point-cloud data 500*.

In this regard, the above-mentioned features 520* may be markers placed at predetermined locations inside the tumbling vessel 510, they may be a shape of the liner 520 itself and/or they may be a pattern of a surface texture, surface composition or surface material indicated by the intensity information of the datapoints 540*. Since the markers, liner 520 and materials inside the mining equipment are of a certain, identifiable shape and property that are also represented in the acquired datasets 501*, 502*, feature detection, edge detection, line tracing or spline fitting over the datapoints 540* or a surface represented by the datapoints 540* in the datasets 501*, 502* may be performed to extract said features 520*. In this regard, the positioning and aligning may comprise a linear transformation, preferably rotating, scaling and/or translating the first and/or second dataset 501*, 502* to maximize a feature correlation, alignment and/or match. Based on a difference between features 520* of the first and second dataset 501*, 502*, the feature correlation, alignment and/or match may be quantified. E.g. a least squares error may be used as a quantifier for feature correlation, alignment and/or match.

Based on the point-cloud data 500*, changes in structure or shape of the inside surface of the mining equipment, e.g. the tumbling vessel 510, may be detected. For example, changes compared to a previous inspection, to the original structure or shape, or the like may be detected. These changes may indicate wear and/or deformation of the mining equipment, the liner 520, an intake system (not depicted) and/or the discharge system 530. As a result, it can be assessed and determined whether the mining equipment the liner 520, the intake system or discharge system 530 need replacement or maintenance to maintain operation and safety of the mining equipment, e.g. of the tumbling grinding mill 500. The visual inspection methods described later may be used for performing this assessment and determining with the point-cloud data 500*.

To allow the assessment of the changes in structure or shape to be carried out, the entire structure of the tumbling grinding mill 500 should be scanned. Alternatively, if only a certain area of the mining equipment is of interest, then a corresponding part of the entire structure should be scanned. Either way, the scan should be a complete scan of the structure or shape of interest and be of a certain quality/resolution. Otherwise, the assessment may fail due to incomplete or low quality/resolution data. To assure that the scan is complete and of at least a given quality/resolution, a geometry 510* of the mining equipment, e.g. the tumbling grinding mill 500, is estimated based on the point-cloud data 500* and a region 550* of the estimated geometry 510* that indicates insufficient data or a region of interest is identified by use of the point-cloud data 500* (see also FIG. 3B). Also, when being provided with information of position and orientation of the sensor 30, an indication of (or an indication of a direction towards) the region indicating insufficient data or the region of interest may be provided without having to first estimate the geometry.

Figure 3B:
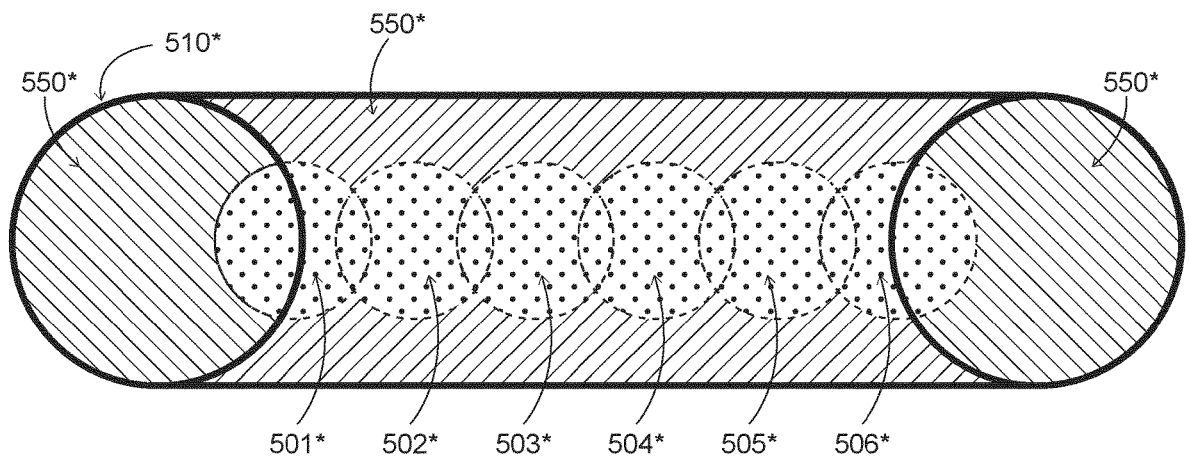

Regarding the geometry estimation, it may be performed by positioning a basic geometry 510*, e.g. a cylinder in the case of the tumbling grinding mill 500, in the point-cloud data 500* (constituted by the datasets 501*, . . . 506* in FIG. 3b). A basic geometry may be considered as a collection of three-dimensional points that may be joined by edges to form faces between the edges. The number of points of the basic geometry 510* should be kept as low as possible to minimize computational load, whilst a basic representation of the point-cloud data 500* is still achieved. Herein, an R-squared error between the basic geometry 510* and the datapoints 540* of the point-cloud data 500* may be 0.75, preferably 0.8 or 0.9.

The basic geometry 510* may be translated, rotated and scaled, until the difference between the basic geometry 510* and the datapoints 540* of the point-cloud data 500* is minimized (e.g. by use of least squares regression or maximizing correlation).

It is worth noting, that the impactor 200, the high pressure grinding rolls 300, the stirred grinding mill 400 (depicted in FIG. 1B to 1D), and the horizontal or vertical mill may also use one or more cylinders as basic geometries 510*, whereas the compression crusher 100 (depicted in FIG. 1A) may use a pair of planes as a basic geometry 510*. Herein, a basic geometry 510* with a low number of faces, e.g. below a certain number of faces, for example below 100, is used when estimating the geometry of the mining equipment, to assure that manipulation of and comparison with the basic geometry 510* is not computationally intensive.

It is also worth mentioning, that the point-cloud data 500* may be meshed first and then the basic geometry 510* may be positioned in and compared with the mesh. During meshing, the coordinate information of each datapoint 540* may be treated as a vertex and connected to its neighboring vertices (e.g. based on the coordinate information of other datapoints 540*) by edges to form faces. By applying smoothing filters and/or vertex-merging filters to the mesh, the number of edges, vertices and faces is reduced. Consequently, comparing the basic geometry 510* with the filtered mesh for aligning the basic geometry 510* becomes even less computationally intensive.

By use of the basic geometry 510*, holes or missing data in the point cloud data 500* can be identified and notified. For example, where there are insufficient datapoints 540* situated on or close to the surface of the basic geometry 510*, a region 550* indicating insufficient data may be determined. In other words, such holes indicate missing data that can be identified using the basic geometry 510*.

A region 550* indicating insufficient data may be identified as follows. Datasets 501*, . . . 506* may be mapped onto the surface of the basic geometry 510* and regions of the basic geometry 510* not covered by the datasets 501*, . . . 506* may be identified as the region 550* indicating insufficient data. Herein, the circumference of each dataset 501*, . . . 506* based on the scanning range 31 of the sensor 30 may be used to keep track of the scanned surface and the unscanned surface of the basic geometry, allowing a determination of the region of (missing or) insufficient data. Equally, the number of datapoints 540* within an area, i.e. the "datapoint density", may also be used to indicate whether the dataset 501*, . . . 506* is sufficiently populated, allowing a determination of the region of insufficient data. Equally, by computing the absolute values of the gradients over the surface of the point-cloud data 500*, values exceeding a certain threshold indicate a region of high sensing inaccuracy, which allows a determination of the region of (low quality or) insufficient data.

Figure 11A:
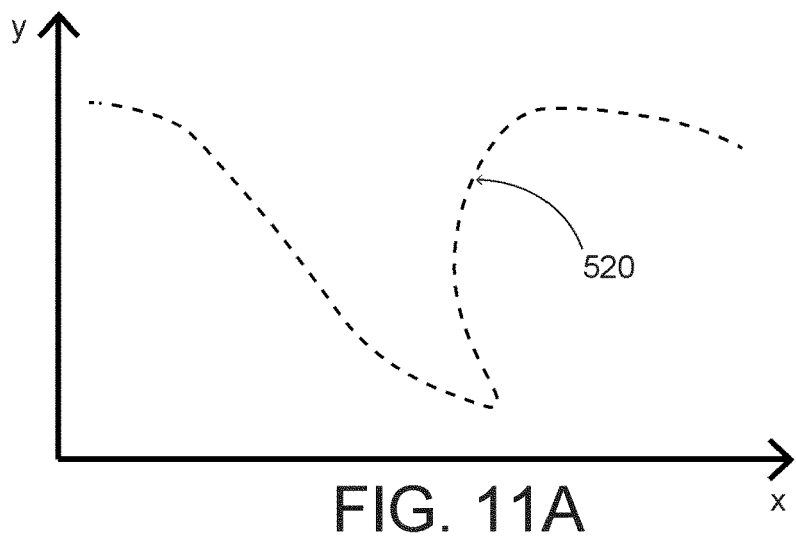
FIG. 11A to 11C depict an example of calculating the change in gradient of the obtained datapoints, whereby a region of insufficient data and/or high sensing inaccuracy may be determined.
Figure 11B:
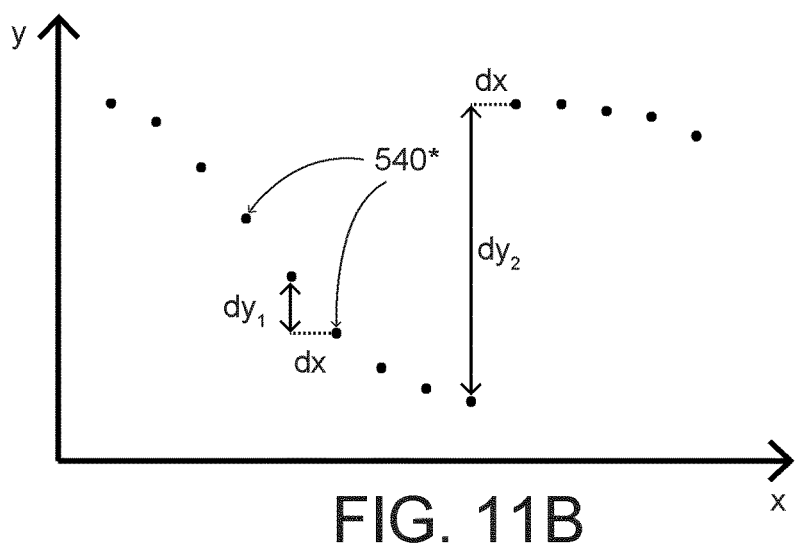
Figure 11C:
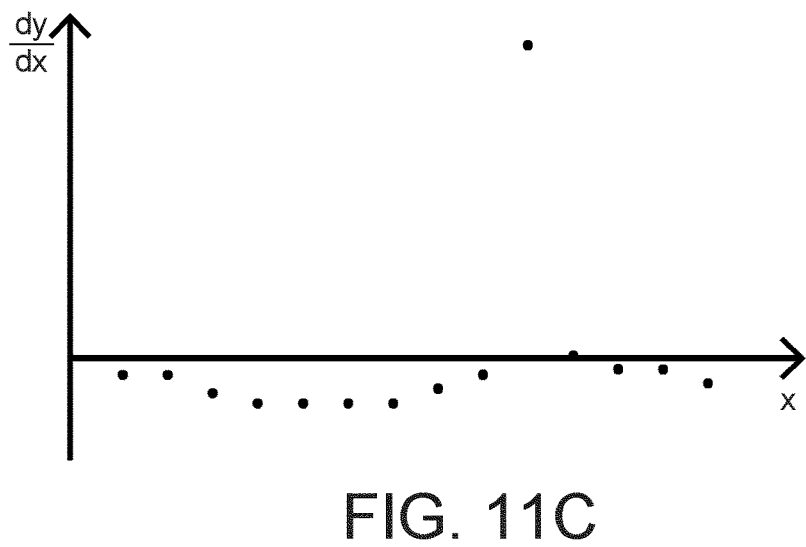

FIG. 11A to 11C depict an example how the absolute values of the gradients over the surface of the point-cloud data 500* may be computed. Herein, FIG. 11A corresponds to a cross-section of the liner 520 shown in FIG. 2D. The shape of the liner 520 is included in FIG. 11A for reference. A scan of the liner 520 would result in a finite number of datapoints 540* which may be plotted as shown in FIG. 11B. As described above, each datapoint 540* represents a point in space corresponding to an inside surface of the mining equipment, e.g. the liner 520 shown in FIG. 2D or illustrated in FIG. 11A. In FIG. 11B, the datapoints 540* are represented as the distance y from the sensor 30 to this point in space, and each value of the distance y is measured for different orientation angles x of the sensor 30. The combination of datapoints 540* in FIG. 11B reflecting distance y and angles x is referred to as an xy-function, which also represents the inside surface of the mining equipment.

The gradient or mathematical differentiation of this xy-function is computed by dividing the change in distance to the inside surface dy by the change in angle dx (i.e. dy/dx). Assuming, for simplicity, that the change in angle is a constant, the gradient for two of the datapoints 540* in FIG. 11B may be calculated as dy1/dx and dy2/dx. Herein, dy1/dx returns a small and negative value compared to dy2/dx, which returns a large and positive value as indicated in FIG. 11C. Based on the absolute value of these gradients it can be determined that large values exceeding a certain threshold (e.g. a statistical value of all y values, such as the upper quartile) indicate inaccuracies and/or holes in the point-cloud data. As depicted in FIG. 11B, the gap of size dy2 is due to the scanning shadow 32 shown in FIG. 2D, thereby indicating that part of the surface has not been sufficiently scanned.

Instead of comparing the absolute value of the gradients (or the mathematical differentiation of the xy-function) the absolute value of the change in distance dy may be compared to a threshold to save on computational load.

In the above, the distance y is used as the distance from the sensor 30 to the inside surface. If the sensor does not remain at the same position inside the mining equipment when rotating, the distance y may be derived by use of the basic geometry 510*. More specifically, the distance y may be the distance from each datapoint 540* to the closest surface of the basic geometry 510*. As such, the y values represent the Euclidean distance from each datapoints 540* of the point-cloud data 500* to the surface of the basic geometry 510*. A x value may then be based on the location of the datapoint 540* along a circumference of the basic geometry, e.g. mimicking a stationary and rotating sensor 30. Put differently, the xy-function may be determined by normalizing the point-cloud data 500* based on the basic geometry 510*.

When applying either of the above method, the skilled person understands that, where a change in distance dy or the gradient/mathematical differentiation of the xy-function exceeds a certain threshold, this region is determined as a region of high sensing inaccuracy. This region of high sensing inaccuracy may also be mapped onto the surface of the basic geometry 510* as the region 550* indicating insufficient data. Equally, scanning shadows 32 causing discontinuities in the datasets 501*, . . . 506* and the point-cloud data 500* may also be identified on the surface of the basic geometry 510* and determined as the region 550* indicating insufficient data.

Given the region 550* indicating insufficient data, if the inspection staff is "virtually painting" with the sensor 30, information about the scanning can be conveyed to the staff to correct the "virtual painting". For example, a display may indicate where the region 550* indicating insufficient data is located. Herein, the region 550* indicating insufficient data may be referred to as an identified region 550* (e.g. that has been identified on the surface of the basic geometry 510*) and may be color-coded or otherwise highlighted to notify the inspection staff about its location relative to the position and orientation of the sensor 30. Thereby, the display instructs and/or guides the inspection staff to move the sensor 30 so that the identified region 550* is (re-) scanned. Also, the identified region 550* may also be used to automatically re-orientate and/or move the sensor 30 to (re-)scan the identified region 550*.

In the following, a procedure to guide a user or inspection staff to the identified region 550* is explained in reference to FIG. 8. Herein, if the (total) area of the identified region 550* is equal to or larger than a predetermined size (e.g. above a predetermined value), the guiding procedure is repeated to continue scanning the identified region 550*.

Once the area of the identified region 550* is smaller than the predetermined size (or below the predetermined value), the guiding procedure concludes that sufficient data of high enough quality has been obtained to perform the analysis.

More specifically, during the guiding procedure the display displays a part of the basic geometry 510* (S11) and identifies an area of the identified region 550* (S12). However, based on orientation of the displayed view, e.g. due to the position and rotation of the sensor 30, the identified region 550* may lie outside the scanning range 31 of the sensor 30. Therefore, if the area of the identified region 550* is greater than or equal to a predetermined size (S13: YES) the guiding procedure determines a "next coordinate" (S14). A next coordinate is associated to or lies within the identified region 550* and is preferably located on the surface of the basic geometry 510*. This next coordinate is extracted and highlighted (S15), e.g. by displaying part of the surface of the basic geometry 510* close to the next coordinate in a different color, or by animating an arrow on the display pointing in a direction in which the sensor 30 should be rotated and/or translated, i.e. moved, so that its scanning region 31 covers the next coordinate.

Figure 12A:
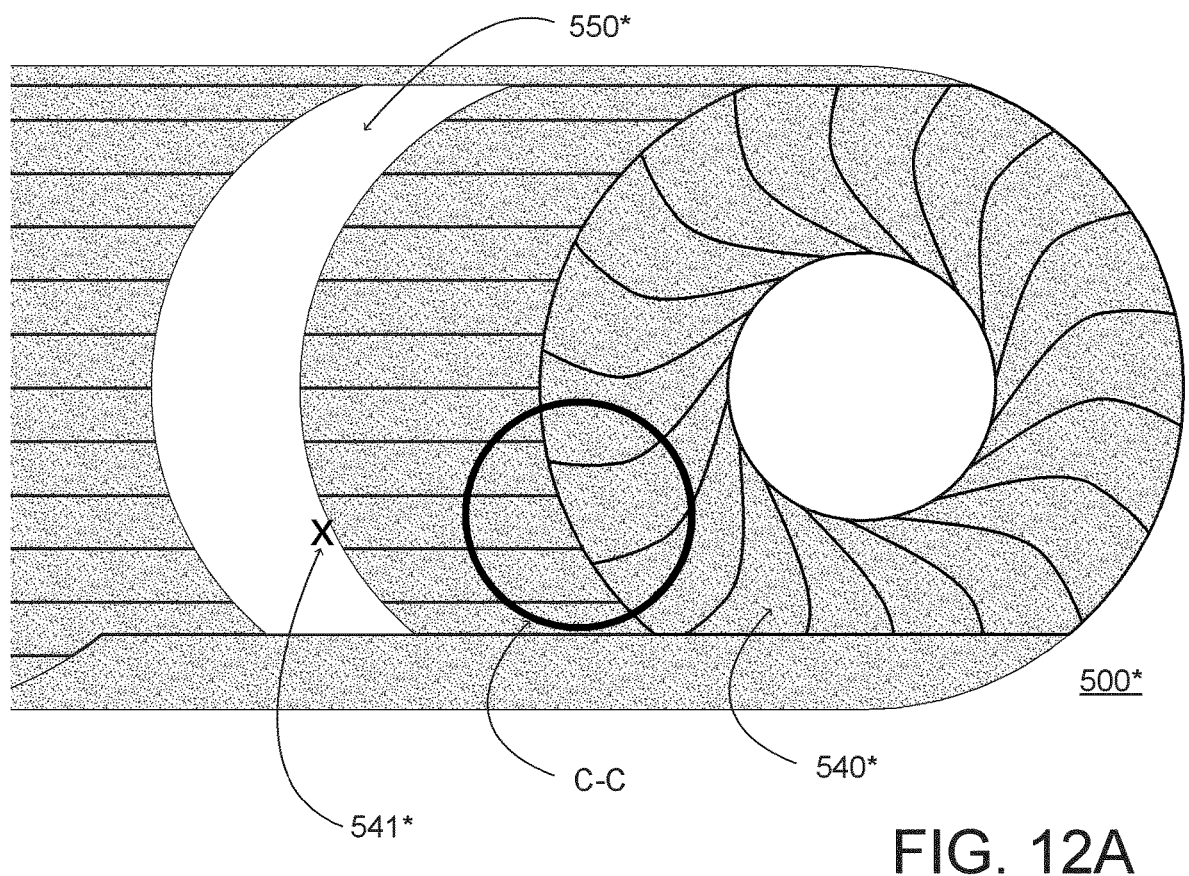
FIGS. 12A and 12B depict an example of guiding the user and/or causing the sensor to move in a direction such that an identified region or region of insufficient data is (re-)scanned.
Figure 12B:
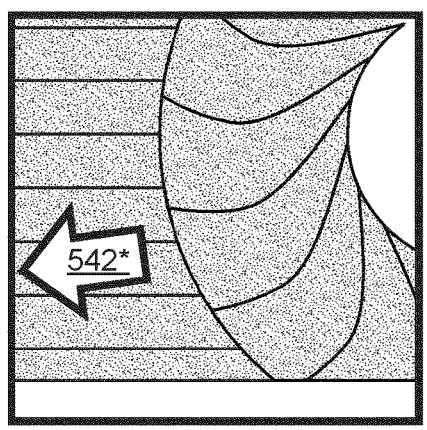

FIGS. 12A and 12B illustrate an example of visually displaying a next coordinate. In FIG. 12A, a scan comparable to that in FIG. 2B has been performed, wherein an identified region 550* needs to be scanned to complete the scanning process. A next coordinate 541* has been identified within the identified region 550* and serves as a target for continuing the scan. Assuming that the scanner is presently pointed towards the region labeled C-C in FIG. 12A, the scanning range of this scanner does not cover the next coordinate. More specifically, an exemplifying display corresponding to the scanning region as depicted in FIG. 12B does neither include the identified region 550* nor the next coordinate within the field of view. Therefore, an arrow 542* may be superimposed on the display in FIG. 12B to indicate a direction towards which the sensor should be moved to cover the next coordinate 541* and scan identified region 550*.

Thereby, the guiding procedure causes the sensor 30 to move or to be moved in a direction towards the next coordinate until the next coordinate falls inside a scanning range 31 of the sensor 30 (S16). As a result, the identified range 550* is (re-)scanned, whereby more data is added to the point-cloud data 500* and the size of the area of the identified region 550* (e.g. the region 550* of insufficient data) is reduced.

It is worth noting, that by determining the location of the next coordinate within the identified region 550* as close as possible to the edge of the scanning range 31 of the sensor 30, the necessary movement to (re-)scan the identified range 550* is minimized. Determining the next coordinate in this manner accelerates the scanning process since the movement of the sensor 30 is minimized. This may be particularly beneficial when the sensor 30 is controlled automatically or autonomously, e.g. by use of a robot or drone having limited battery life and time to perform the scanning procedure. Alternatively, when the sensor 30 is manually moved, and a user or inspection staff is notified of the position of a next coordinate and is instructed to move the sensor 30 in a direction towards the next coordinate until the next coordinate falls inside the scanning range 31 of the sensor 30, physical work and strain on the user or inspection staff is reduced when the necessary movement is minimized as described above.

When the next coordinate falls inside the scanning range 31 of the sensor 30, a further, e.g. third, dataset 503* is acquired from the sensor 30, comprising datapoints 540* at coordinates as described above (S17). To then combine this third dataset 503* with the already acquired point-cloud data 500*, features 520* are extracted from the point-cloud data 500* and the third dataset 503* as described above (S18). Then, the third dataset 503* is positioned and aligned to the point-cloud data 500* and combined into the point-cloud data 500* as described above (S19). Then, the guiding procedure re-estimates the basic geometry 510* and returns so as to guide scanning of the remaining identified region 550* (S19 to S11).

Since more geometry information and detail of the mining equipment are captured and represented by the point-cloud data 500*, the next estimation of the basic geometry 510* of the mining equipment is improved since it is based on the updated point-cloud data 500*. Further, since the point-cloud data 500* has increased or changed, the region 550* indicating insufficient data may have decreased or changed, too. Therefore, the identified region 550* on the (re-)estimated geometry 510* associated with insufficient or low-quality data is also re-identified as outlined above (S12), but by use of the updated point-cloud data 500*. As a result, the area of the identified region 550* may have decreased or changed.

The above guiding procedure from re-estimating and displaying the basic geometry (S11) to updating the point-cloud data 500* is repeated as long as the identified area of the identified region 550* (S12) is greater than or equal to the predetermined value (S13: YES). In case several identified regions 550* have been identified, the above guiding procedure is repeated as long as the sum of all areas of the identified regions 550* is greater than or equal to said predetermined value.

Once the area of the identified region 550* is smaller than the predetermined value (S13: NO), the analysis (e.g. analysis of faults, wear and/or degradation) based on the point-cloud data 500* is performed and the scanning procedure ends (S20). Thereby, since the region 550* of insufficient data is below a threshold, completeness and quality/resolution of the point-cloud data 500* is assured. As a result, the duration of the inspection is kept short, improving safety of inspection staff and reducing mining equipment down-time.

Without this human-machine guidance procedure, data may be missing, insufficient or erroneous, which would only be noticed during the subsequent analysis of the acquired point-cloud data 500*. Therefore, unnecessary repetitions of the scanning procedure are avoided.

For the human-machine guidance procedure, the above-mentioned display may be installed with the sensor 30, e.g. if the scanning device comprising display and sensor 30 is handheld. When remotely controlling the position and orientation of the sensor 30 from outside the mining equipment, the display may be part of an augmented reality (AR) or virtual reality (VR) kit worn by the staff. VR may also be used, if the sensor 30 is supported by a flying drone or a robotically suspending device inserted into the mining equipment. As a result, the inspection staff can still perform the "virtual painting" but need not enter the hazardous environment inside or close to the mining equipment.

If the movement of the sensor 30 is autonomously controlled, e.g. by a control system steering the flying drone or the suspending device, the flight- or movement-plan may be corrected dynamically, based on the identified coordinates.

[Principle/Independent Component Alignment]

When combining a new dataset 501*, . . . 506* with another dataset 501*, . . . 506* or the point-cloud data 500*, principle components (PCs) or independent components (ICs) may be extracted from the features 520* for the alignment of the new dataset 501*, . . . 506* (in the following, PCs may also include ICs). After all, PCs are indicators unique to each feature 520* indicating orientation and scale of the corresponding feature 520*. Hence, with low data requirements and processing requirements PCs may be linearly transformed to bring them into alignment, allowing the features 520* and therefore the new dataset 501*, . . . 506* to be brought into alignment quicker.

E.g. the alignment between the datasets 501*, . . . 506* and/or the point-cloud data 500* may be indicated by a dot product of the features 520*, and preferably the PCs. If multiple features 520* and/or PCs have been extracted, the alignment of the datasets 501*, . . . 506* and/or point-cloud data 500* may be indicated by convolution and/or correlation of the features 520*, and preferably the PCs. Since dot product, convolution and/or correlation may (in addition to the above-mentioned least squares regression) provide an indication of alignment or match, operation on PCs can be performed with significantly lower computational load, when compared against the same operations performed on datapoints 540* of the extracted features 520*.

In this regard, and as already described above, the aligning of PCs also comprises a linearly transformation, preferably rotating, scaling and/or translating the dataset 501*, . . . 506* and/or the point-cloud data 500* to maximize alignment and/or match.

[Data Acquisition during Operation]

Figure 8:
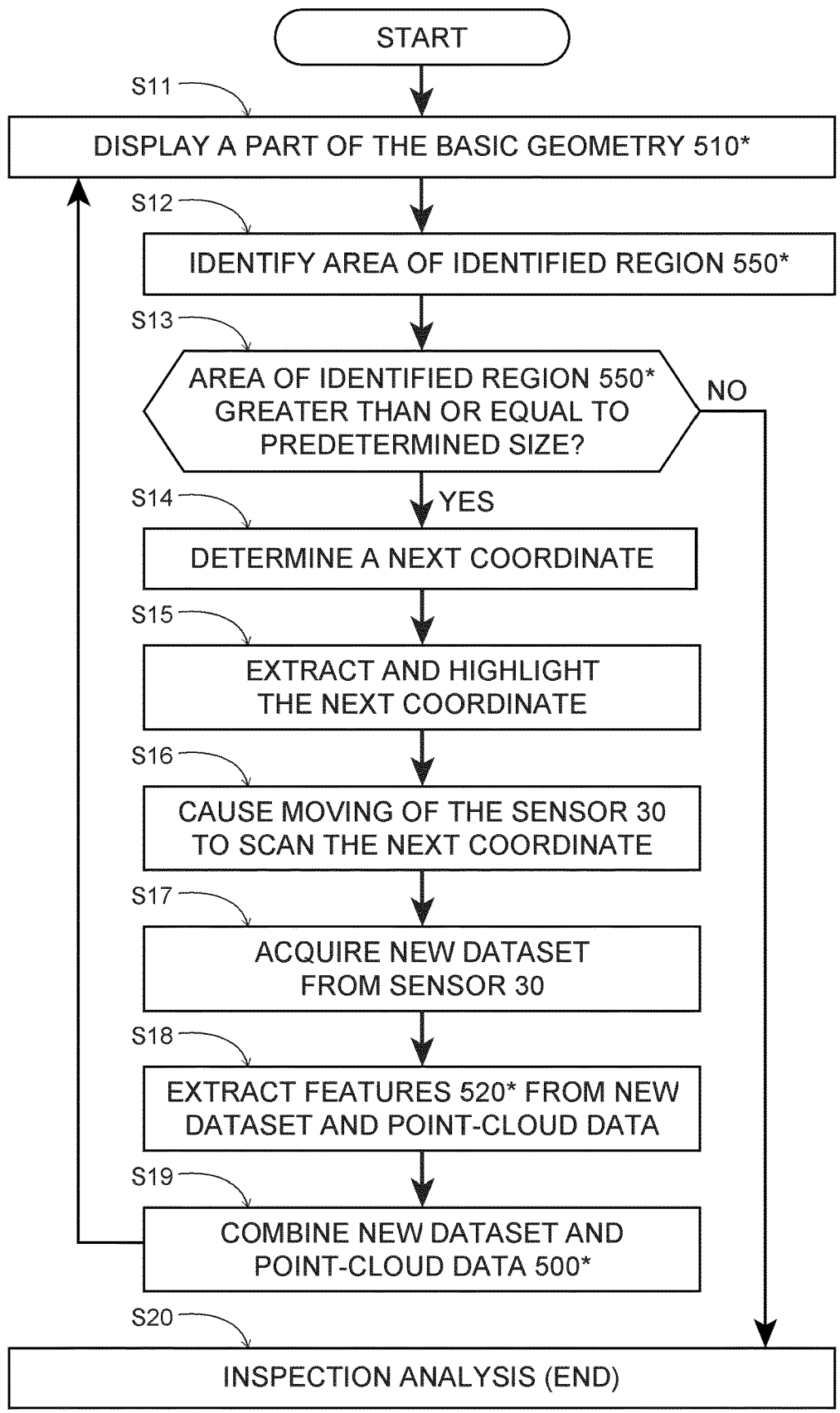
FIG. 8 depicts the computer-implemented method of a guiding procedure for scanning the mining equipment for inspection analysis.

As described above in reference to FIG. 2A to 2D and FIGS. 3A and 3B, point-cloud data may be acquired by moving a sensor 30 in reference to a mining equipment (e.g. the tumbling grinding mill 500) to acquire complete and high-quality point-cloud data by use of an automated or a continuously guided human-machine interaction process (e.g. the guiding process of FIG. 8). The embodiment described above is directed towards inspecting mining equipment during its down-time. In the following a further embodiment is described for performing inspection of a mining equipment when operating.

To better illustrate and explain the subsequent embodiment, the tumbling grinding mill 500 and its geometry are used to explain the process of inspecting an operating mining equipment. However, other types of mining equipment (as described above or depicted in FIG. 1A to 1E) may equally be used.

FIG. 4A to 4E depict a sensor 30 inside a tumbling grinding mill 500, i.e. the tumbling vessel 510 thereof. Here, the tumbling grinding mill 500 is in operation and rotates, e.g. in direction B, thereby performing its mining operation on mining material 10 by aid of a liner 520, which is installed inside of the tumbling grinding mill 500. The sensor 30 is moved through the inside of the mining equipment, e.g. by rotating it, e.g. in direction C (see FIG. 4A to 4C), and/or by moving it essentially in parallel to the rotation axis of the mining vessel 510 (see FIG. 4D (non-rotating sensor) and FIG. 4E (rotating sensor)). Here, the mining equipment, i.e. the tumbling grinding mill 500, rotates around its rotating axis when operating. By use of the sensor 30, first point-cloud data and second point-cloud data of the mining equipment are acquired akin to the procedure outlined above and shown in FIGS. 3A and 3B, where multiple partially overlapping datasets 501*, . . . 506* are acquired, positioned, aligned and combined into each of the point-cloud data 500*.

In the present embodiment, the first and second point-cloud data represent different passes or scans of a surface inside the mining equipment. This surface may be the structure of the mining equipment (or its liner 520) or it may be mining material 10 (e.g. rocks or slurry) on or covering the surface of the structure of the mining equipment. An overlap of the first and the second point-cloud data represent the same part of the mining equipment, but at different times and/or orientations.

FIGS. 4A to 4C are referred to for illustrating how the different point-cloud data (representing different passes or scans of the same surface of the mining equipment) may be obtained. For example, to acquire the first point-cloud data, the sensor 30a may begin scanning the inside of the tumbling vessel 510 with a scanning range 31 orientated as shown in FIG. 4A. Then the sensor 30 is rotated by 360°*n+90° in direction C (where n is a natural number including zero), and the tumbling vessel is rotated by 270° in direction B until arriving at the situation depicted in FIG. 4B. Herein the scanning range 31 of the sensor 30 has rotated at least (n+1)*360° relative to the mining equipment. By continuously scanning, e.g. acquiring, positioning, aligning and combining datasets, throughout this rotating, the sensor 30 may scan the entire inside surface of the tumbling vessel 510 at least once. Therefore, based on the output of the sensor 30 during the transition from FIG. 4A to 4B, the first point-cloud data is acquired. The same procedure is repeated when transitioning from FIG. 4B to 4C, and the second point-cloud data is acquired. In other words, the second point-cloud data is acquired after the first point-cloud data and after the sensor 30 and/or the mining equipment have/has moved. As a result, the acquired first and second point-cloud data represent the same parts of the structure of the mining equipment (e.g. the tumbling grinding mill 500), but with different obstructions of the scanned surface caused by mining material 10 such as rocks and slurry (the latter is not depicted).

It is worth mentioning, that the sensor 30 may have also rotated faster, to arrive at a total rotation of 90°+n*360° (e.g. where n is a natural number greater than zero) in FIG. 4B, relative to FIG. 4A. Thereby the sensor 30 scans the unobstructed inside surface of the mining equipment (at least partially) more than once. Thereby, a higher quality first point-cloud data may be acquired, particularly since occurrence of shadows 32 (see FIGS. 2C and 2D) may be omitted. The shadow-avoidance may be particularly achieved, when the sensor 30 is not located at the center of rotation of the mining equipment (e.g. tumbling vessel 510) but at an offset arrangement. In this arrangement, the sensor 30 scans surfaces at different angles, allowing compensation for scanning-shadows, e.g. due to an obstructing liner 520 that is protruding into the tumbling vessel 510 at a certain angle. For example, in FIGS. 4A to 4C, the sensor may be located further to the top right, to extend the scanning range 31 into a region behind the protrusions of the liner 520. Thereby sufficient and high quality first point-cloud data can be obtained. The above also applies to the second point-cloud data.

Also, if there are no significant scanning-shadows, e.g. if no liner 520 is present or if its protrusions are insignificant to the scanning operation, the sensor 30 may not rotate at all and only the tumbling vessel 510 may be rotating during the acquiring of the first and second point-cloud data. To minimize the possibility that the surface of the mining equipment scanned by the sensor 30 is covered or obstructed by mining material 10, the sensor 30 may be pointed in a direction, where most of the mining material 10 has most likely detached from or slid off the surface (e.g. FIG. 4A). Additionally, when using such a "still" or not rotating sensor 30, protection from mining material 10, such as a cage, may be rigidly installed around the sensor 30, but not protruding into the scanning range 31. To avoid synchronizing the rotation of the sensor 30 and the tumbling vessel 510, the sensor 30 is preferably rotated in a direction C opposite to the rotation direction B of the mining equipment. When rotating in opposite directions, the sensor 30 may rotate at any angular velocity, e.g. faster than, as fast as or slower than an angular velocity of the mining equipment. The acquisition of a point-cloud data is, however, finished once the inside of the mining equipment has been scanned at least once.

Also, the method explained in the section [Data Acquisition] may also be used for acquiring the point-cloud data 500*. Herein, the identified region 550* may be scanned when the surface of the mining equipment associated to the identified region 550* is less likely to be covered or obstructed. E.g. it is less likely that the surface of the mining equipment within the scanning range 31 as shown in FIG. 4A is covered by mining material 10, whilst it is more likely that the surface of the mining equipment within the scanning range 31 as shown in FIG. 4C is covered by mining material 10. Therefore, the rotation of sensor 30 may be automatically adjusted so that alignment of the scanning range 31 with the identified region 550* (or the above-mentioned next coordinate) falls within a timing, when the surface of the mining equipment associated to the identified region 550* is less likely to be covered or obstructed by mining material 10 (e.g. FIG. 4A). Also, to prevent mining material 10 from moving excessively and/or obstructing the scanning range 31 unnecessarily, the mining equipment 500 may rotate at an angular velocity equal to or lower than an angular velocity during normal operation. Herein, the mining equipment 500 may be continuously "inched" (e.g. moved forward at a very slow angular velocity) avoiding the need of having to halt and secure the mining equipment 500 between every scanning iteration. To protect the sensor 30 from mining material, e.g. trapped and falling from the liner 520, a cage may be provided surrounding the sensor 30.

After having acquired the first and second point-cloud data from the sensor 30, datapoints constituting the surface of the mining equipment are derived from the first and second (i.e. multiple) point-cloud data. Herein, the fact that the mining equipment continues to rotate during the scan is used, since its rotation reveals a surface of the mining equipment that would be covered by rocks or slurry if the mining equipment were scanned whilst being stationary.

An example of a method for determining the datapoints constituting the surface of the mining equipment is described. First, surfaces inside the mining equipment are determined based on each the first and second point-cloud data. Then, based on the determined surfaces, a location of the datapoints representing a surface inside the mining equipment is estimated, and a point-cloud data generated based on this estimation.

For example, for each point-cloud data, a surface of the inside of the mining equipment is determined and stored. Then the surfaces determined from each point-cloud data are aligned and compared to classify or estimate which parts of the surfaces represent the structure of the mining equipment and which parts of the surfaces represent mining material 10 (e.g. rocks or slurry) covering the structure of the mining equipment. Herein, the alignment may be performed similar to the feature extraction and alignment explained above. However, information regarding the relative rotation of sensor 30 and mining equipment may be used to perform the initial alignment, whereas the above-mentioned alignment procedure using extracted features is used for fine alignment. E.g. to aid the aligning, a reference marker on the mining equipment and on the sensor 20 may provide information regarding their respective orientation. Further, control commands for rotating the mining equipment and/or sensor 30 may be used to determine their present orientation. Therefore, the acquired first and second point-cloud data are corrected in rotation based on the rotation angles of the sensor and the mining equipment.

Based on this classification or estimation, only those parts of the surfaces representing the structure of the mining equipment are extracted, combined and used for estimating the geometry or datapoints corresponding to an inside surface of the mining equipment. An example of this estimation is explained below.

Figure 5A:
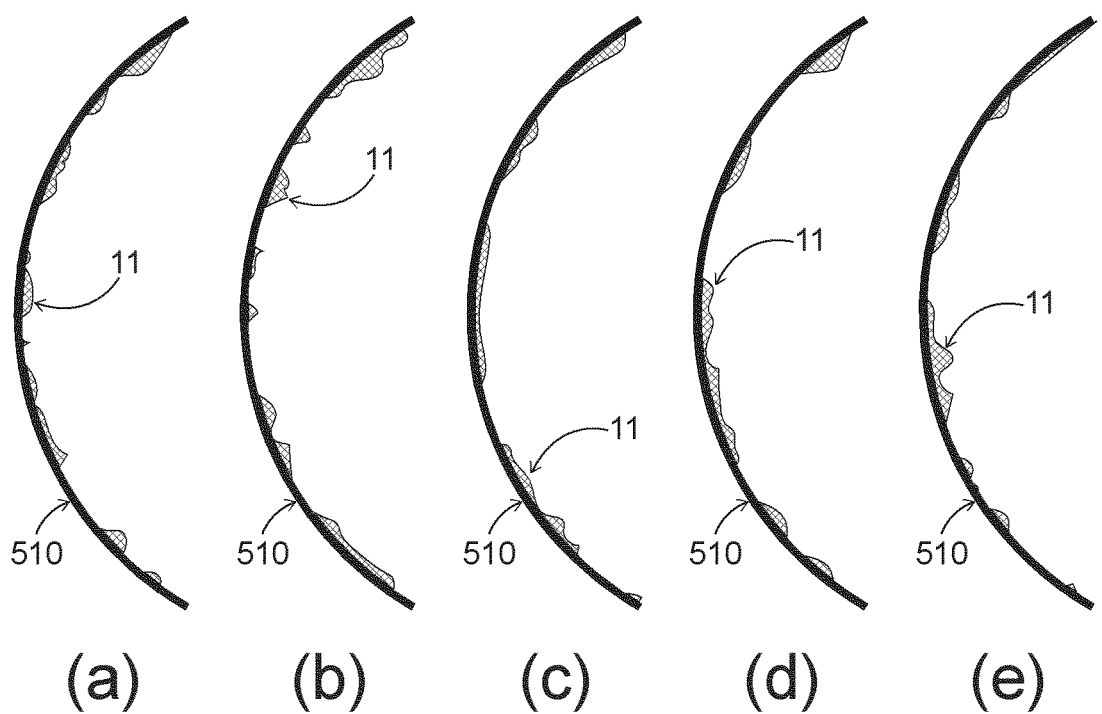
FIG. 5A to 5C depict a different method for data acquisition when performing inspection of a tumbling mill.

Referring to FIG. 5A, it is assumed that a first and second point-cloud data (e.g. FIG. 5A (a) and (b)) are acquired based on the method described above. For simplicity the mining material and liner are omitted and only a section of the rotating tumbling vessel 510 and slurry 11 are depicted in FIG. 5A. Nonetheless, the same procedure is equally applicable to mining material 10 other than slurry 11. Since the tumbling vessel 510 rotates and is subjected to changing or varying forces from mining material 10 and/or slurry 11, the covering or coating on the inside surface of the tumbling vessel 510 changes from a first scan to a second scan. Therefore, the corresponding first point-cloud data and the second point-cloud data indicate different inside surfaces although they scanned (at least partially) the same surface of the mining equipment. Based on the first and second point-cloud data (and/or further point-cloud data, e.g. a third to fifth point-cloud data in FIG. 5A (c) to (e)) multiple scanned surfaces corresponding to the same surface of the mining equipment are aligned and compared.

Figure 5B:
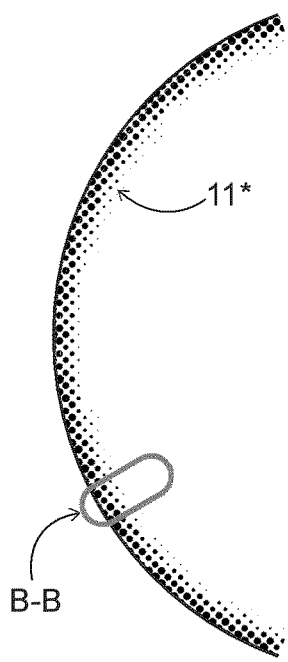
Figure 5C:
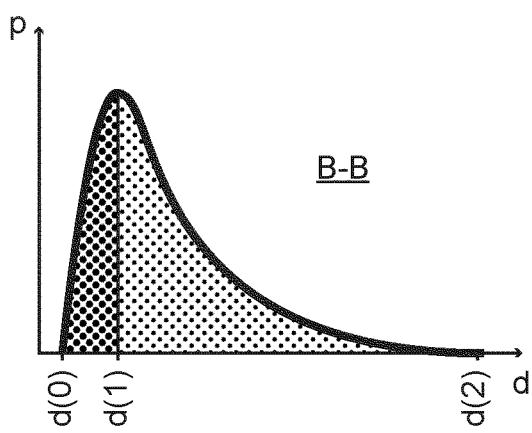

For instance, as indicated in FIG. 5B, a frequency or probability density 11* may be acquired from the plural point-cloud data indicating the frequency or probability of a surface being at a certain distance from the sensor 30. More specifically, when focusing on the region B-B in FIG. 5B, a Weibull-like distribution like the one depicted in FIG. 5C may occur. Herein, with change in distance d towards the sensor 30, the frequency or probability density p of a surface varies. In the example in FIG. 5C, the largest probability density is at distance d(1). Here, it is assumed that distances closer towards d(2) may have been caused by slurry 11 being stuck on the surface of the structure of the mining equipment. Further, it is assumed that distances closer towards d(0) may have been the result of measuring errors or of measurements at which the surface of the structure of the mining equipment has been cleaner than usual. In a case where the measuring error is sufficiently small, e.g. by achieving a measuring tolerance of ±0 mm to ±50 mm, preferably ±1 mm to ±10 mm or ±1 mm to ±5 mm, the distance between d(0) and d(1) may be narrowed to zero.

Based on this probability density distribution, the distance from the sensor 30 to the surface of the mining equipment may be classified to fall between or on distances d(0) to d(1). When the measuring error is negligible the distance from the sensor 30 to the surface may be determined as d(1). When applying this classification to not only the region B-B, but to the entire circumference or surface of the mining equipment, the surface of the mining equipment and hence the geometry of or datapoints representing a surface of the inside of the mining equipment can be estimated, despite the mining equipment being operational. The resulting point-cloud data comprising these estimated datapoints may then be used of the subsequent analysis. As a result, the estimation can be performed without halting the mining equipment. Therefore, down-time of the mining equipment is not only reduced but can also even be avoided.

[Inspection System]

Figure 9A:
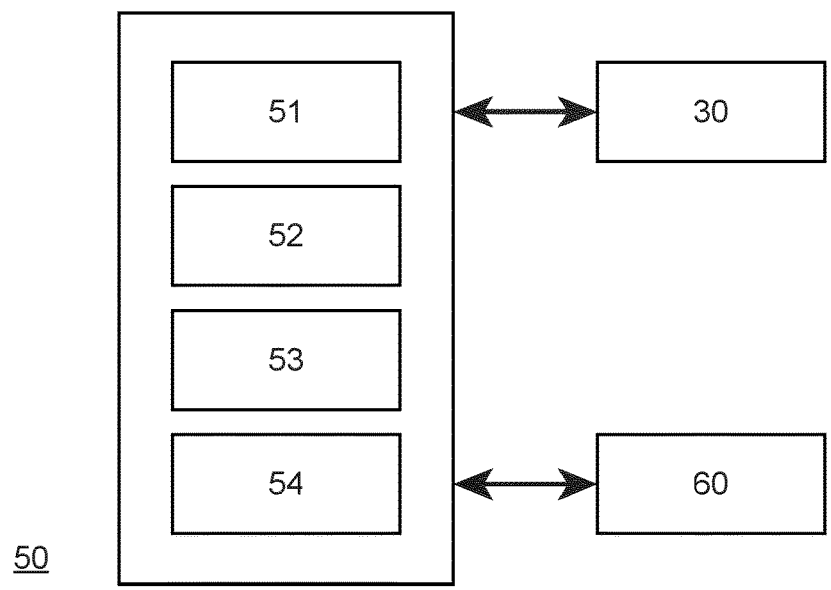
FIG. 9A to 9B depict an inspection system without and with a remote display.

As already mentioned, a display part of a computer monitor, AR or VR kit may be used to aid the inspection of mining equipment. In the following, more detail regarding the inspection by use of an inspection system 50 with a display 60 is presented in reference to FIG. 9A.

Herein, the inspection system 50 further comprises a sensor 30 configured to sense a distance to a surface (also referred to as "scanning"), e.g. in the inside of the mining equipment, a tracker 51 configured to track location and orientation of the sensor 30, and a point-cloud generator 52 configured to generate point-cloud data based on the sensed distance and the location and orientation tracked by the tracker 51. Herein, the tracker 51 may be implemented with the sensor 30 and output as tracking information of the sensor 30, or the tracker 51 may not be implemented with the sensor 30, e.g. alongside the point-cloud generator 52. Most importantly, the sensor 30 and tracker 51 are cone configured to output their data to the point-cloud generator which may be configured to sample, e.g. at regular sampling intervals, values of coordinates and values of angles related to location and orientation of the sensor 30. Further, the point-cloud generator 51 is configured to compute at which coordinates the surface sensed by the sensor 30 is located. These computed coordinates constitute the individual datapoints of the point-cloud data. When the sensor 30 is configured to sense several distances to a surface, e.g. by producing a depth image or depth map, each sensed distance may be used to compute a coordinate of the surface, allowing multiple coordinates to be computed simultaneously, which increases scanning speed. In other words, if a depth image is produced, each location of a pixel of this depth image corresponds to a horizontal and vertical angle from the central sensing axis of the sensor, and each pixel value corresponds to the distance from the sensor 30 to the surface (the sensor 30 of other embodiments may similarly use a depth image). The point-cloud generator 52 may hence be configured to generate a datapoint associated to each pixel, when computing the coordinates constituting datapoints of the point-cloud data.

The inspection system 50 further comprises a surface estimator 53 configured to estimate one or more surface/s based on the point-cloud data and a geometry estimator 54 configured to estimate a (basic) geometry of the mining equipment based on the estimated surface/s. The display 60 is configured to display the estimated surface and/or estimated geometry. Herein, the display 60 may be combined with the point-cloud generator 52, surface estimator 53 and geometry estimator 54, but may alternatively be a standalone device. The surface estimation and geometry estimation may be performed similar to that described above, e.g. in the section [Data Acquisition].

The (basic) geometry of the mining equipment may be used to indicate a region 550* indicating insufficient data (e.g. the identified region 550*) in order to assure completeness and/or quality of the acquired point-cloud data. Preferably, different shading, contouring, coloring or the like may be used to indicate differences in density of the point-cloud data and/or differences in certainty of the estimated surfaces and/or geometry as visual feedback. Herein, uncertainty may be based on the coefficient of determination or the $R^2$-value of an estimated part of a surface and/or part of the geometry. More specifically, this visual feedback provides information to the user or inspection staff, e.g. information on a region 550* indicating insufficient data or inferior quality data, allowing the user or inspection staff to quickly identify said region and assure that the acquired point-cloud data is sufficiently populated with high quality data, for performing the subsequent analysis; e.g. by re-scanning the parts of the mining equipment corresponding to said region as described above. Displaying the estimated surface and/or geometry in such a way is also beneficial when inspecting the mining equipment remotely, e.g. when it is operational and the user or inspection staff in charge of the inspection cannot enter the mining equipment.

Further, the tracker 51 may be configured to also track location and orientation of the display 60 and the display 60 may be configured to display the estimated surface (of the mining equipment) based on location and orientation of the display 60. Consequently, the use of AR or VR kits enables the user or inspection staff to better control or steer location and rotation of the sensor 30 in order to acquire point-cloud data that is sufficient for performing subsequent analysis.

In some instances, however, the user or inspection staff performing the inspection and/or steering of the sensor 30 for acquiring the point-cloud data, may rely on expert knowledge from others in order to assure that the acquired point-cloud data is sufficient for performing subsequent analysis. Equally, others may want to target the focus of the subsequent analysis on regions of interest. Regions of interest may include e.g. those regions that are anticipated to be subject to excessive wear or that have not been inspected for a prolonged period of time. Therefore, the point-cloud data may be transmitted to a terminal, computer or VR/AR kit of the person providing expert knowledge, allowing that person to indicate where the region/s of interest is/are located in the mining equipment. A virtual flashlight may be implemented and used by the person providing expert knowledge to color an area on the (basic) geometry, and mark this area as an identified region 550* and/or region of interest. Information regarding this region/s of interest is then returned to the inspection system and displayed on the display 60, similar to a region 550* indicating insufficient data (e.g. the identified region 550*). The user or inspection staff may then be informed of this region and can perform the scan based on expert knowledge.

However, transmitting the point-cloud data of the entire mining equipment may not be an option, e.g. where the communication link between the inspection system and the expert person is not sufficient for large data transmission. Hence, at least the region of interest of the mining equipment should be scanned and its data should be transmitted to reduce the amount of transmitted data.

Figure 9B:
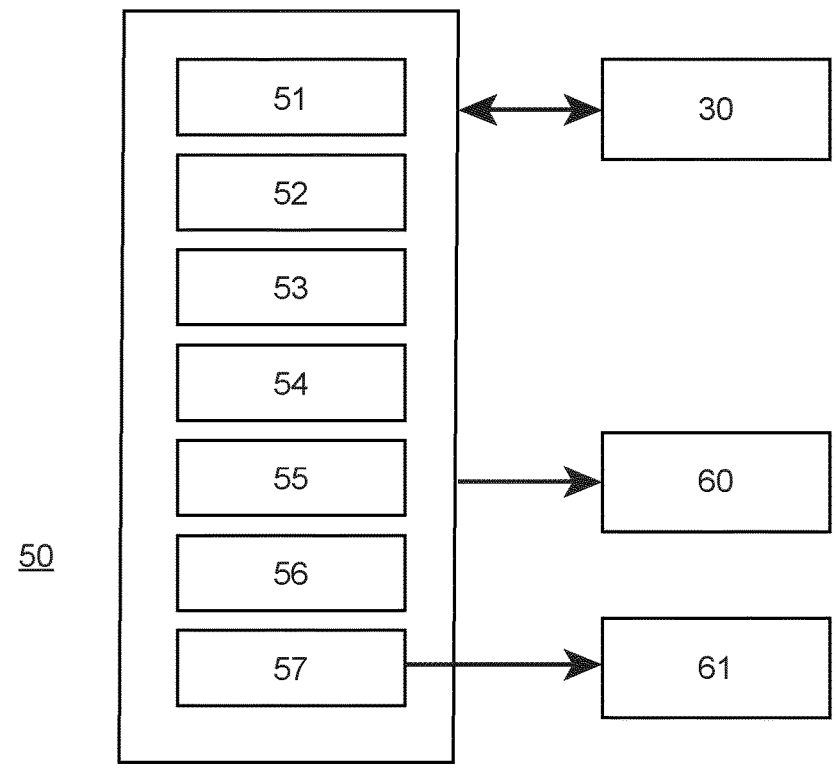

Consequently, and as illustrated in FIG. 9B, the inspection system 50 may further comprise a remote display 61, e.g. at which the person providing expert knowledge is located, a mining equipment database 55, a sub-cloud determiner 56, and a data transceiver 57. Herein, the mining equipment database 55 is configured to store a template geometry of the mining equipment, e.g. based on CAD data of the mining equipment, and a region of interest of the mining equipment. The sub-cloud determiner 56 is configured to extract from the point-cloud data a subset of data as a sub-cloud data based on the region of interest. The mining equipment database 55 and the sub-cloud determiner 56 may be located alongside the tracker 51, the point-cloud generator 52, the surface estimator 53 and geometry estimator 54 as depicted in FIG. 9B. Herein, the data transceiver 57 is configured to transmit the sub-cloud data to and from the remote display 61. Thereby, the region of interest is transmitted to the person providing expert knowledge, and input from this person (e.g. input via an input device beside the remote display 61) is returned to enable the display of the input on the display 60.

Alternatively, the mining equipment database 55 and the sub-cloud determiner 56 may not be located alongside the tracker 51 etc. as described above. E.g. where large servers are required to store the template geometry of the entire mining equipment, it may not be feasible to include them in a device alongside the tracker 51 etc. Herein, the transmitter 57 transmits data including the estimated geometry and an indication of the scanned surface to the sub-cloud determiner 56. Herein, the indication of the scanned surface may be a difference in coloring or parameterization of the estimated geometry according to the scanned point-cloud data. Thereby, not the entire point-cloud data needs to be transmitted to inform about which region/part of the estimated geometry has been scanned. After receipt of this data, the sub-cloud determiner 56 extracts from the mining equipment database 55 the template geometry of the mining equipment and superimposes the received data. Then, the sub-cloud determiner 56, causes the display 61 to display the template geometry with superimposed data, to inform the person at the remote display 61 which part/s of the mining equipment has/have been scanned.

Further, the person providing expert knowledge may be capable of inputting into the mining equipment database 55 which part of a template geometry of the mining equipment constitutes a region of interest. This inputting may be performed in advance, before performing the inspection, or during the inspection, but remotely. In the latter option, the inputting for specifying a region of interest and the transmitting of information regarding the specified region of interest requires a comparatively little amount of data which may still be transmitted over the above-mentioned communication link. Consequently, a remote computer may be co-located with the remote display 61, configured to receive inputs to define another region of interest, and store the region of interest in the mining equipment database 55.

For the case where the mining equipment database 55 and the sub-cloud determiner 56 are arranged with the tracker 51 etc. the sub-cloud determiner 56 may, based on a comparison between the template geometry and the estimated geometry locate the region of interest on the estimated geometry and extract a subset from the point-cloud data 500* as the sub-cloud data that is to be transmitted. Herein, the sub-cloud data may be transmitted every time it is updated by the scanning (e.g. continuously) or once the scan is complete, e.g. when the identified region 550* is sufficiently small. When transmitting the sub-cloud data every time it is updated, new information of the mining equipment may be displayed at the remote display 61, allowing the expert person to determine whether a new point of interest may be added to the mining equipment database 55. Therefore, a cooperative scanning by the user or inspection staff based on feedback from the person providing expert knowledge can be achieved, to assure that the scanning covers every region of interest before performing the analysis of the mining equipment. Further, the amount of data transmitted by the transceiver 57 is reduced.

Additionally, the display 60 may be configured to highlight the region/s of interest on the display 60 to indicate region of interest to the user or inspection staff acquiring the point-cloud data 500*. Therefore, particular emphasis may be put on acquiring point-cloud data 500* constituting the sub-cloud data. As a result, the user is guided to perform the scanning or data acquisition so as to assure that the point-cloud data 500* constituting the sub-cloud data is of sufficient quality and complete. This emphasis may be particularly important, if different quality thresholds are applied to different regions of interest (e.g. by determining a different maximum variance of datapoints of different regions of interest).

If the point-cloud data 500* does not comprise datapoints at the region of interest, the estimated surface and/or geometry may be highlighted at a location where of the region of interest. This highlight may be displayed on the display 60 by use of coloring or an arrow as explained above. In order to detect which regions do not comprise (sufficient) datapoints, a hole detector may be employed that is configured to detect coordinates on the estimated geometry for which the number of datapoints of the point-cloud is below a predetermined value. Also or alternatively, the surface gradient is calculated as described above, and a hole is determined where the gradient is above a predetermined value. These detected coordinates hence constitute "holes" in the acquired point-cloud data 500* that may be highlighted on the estimated geometry that is displayed on the display 60.

Figure 10:
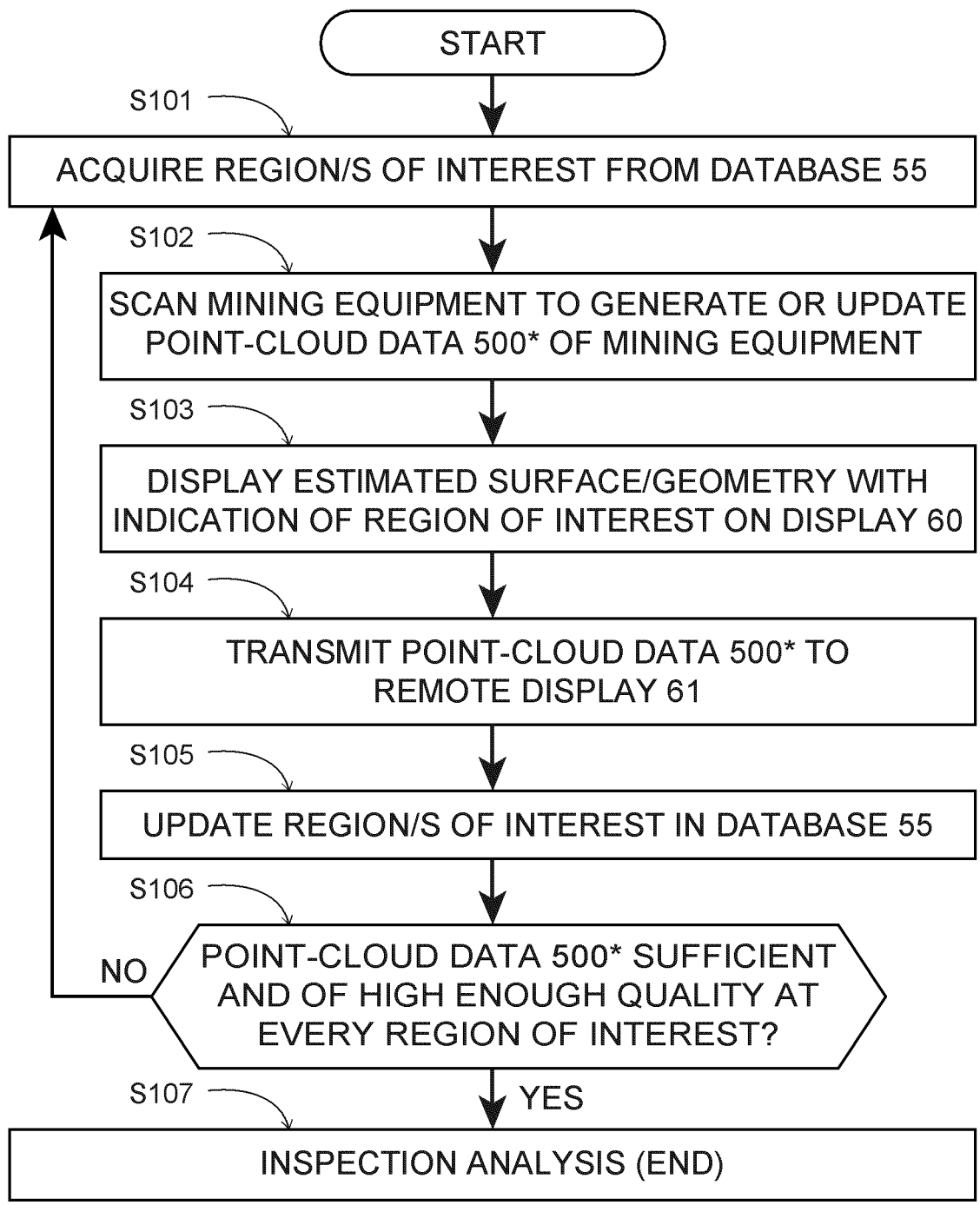
FIG. 10 depicts the computer-implemented method of a feedback procedure for scanning the mining equipment based on input from a person with expert knowledge guiding the scanning.

The above is summarized in the feedback procedure depicted in FIG. 10. Herein, the inspection system 50 acquires one or more regions of interest from the mining equipment database 55 (S101). Then, the mining equipment is scanned (e.g. following a procedure explained above) and the point-cloud data 500* of the mining equipment is generated (S102). Then, the estimated surface and/or estimated geometry are estimated and displayed on the display 60 with an indication of the region of interest (S103). Herein, the indication may be a coloring or arrow pointing in the direction of the region of interest. Then, point-cloud data 500* is transmitted to the remote display 61 (S104). Herein, the entire point-cloud data 500* or the above-mentioned sub-cloud data (corresponding to the point-cloud data 500* at the region/s of interest) may be transmitted. Then, the region of interest may be updated and inserted into the mining equipment database 55 (S105), e.g. if the expert person identifies new regions of interest during the scanning. If it is determined, that the point-cloud data 500* is sufficient (e.g. dense enough) and of high enough quality (e.g. with low datapoint variance) at every region of interest (S106: YES), the inspection analysis is performed (S107). Otherwise (S106: NO), the procedure returns to retrieving or acquiring the points of interest (including new points of interest) and the guided scanning continues.

[Virtual Inspection]

Figure 6:
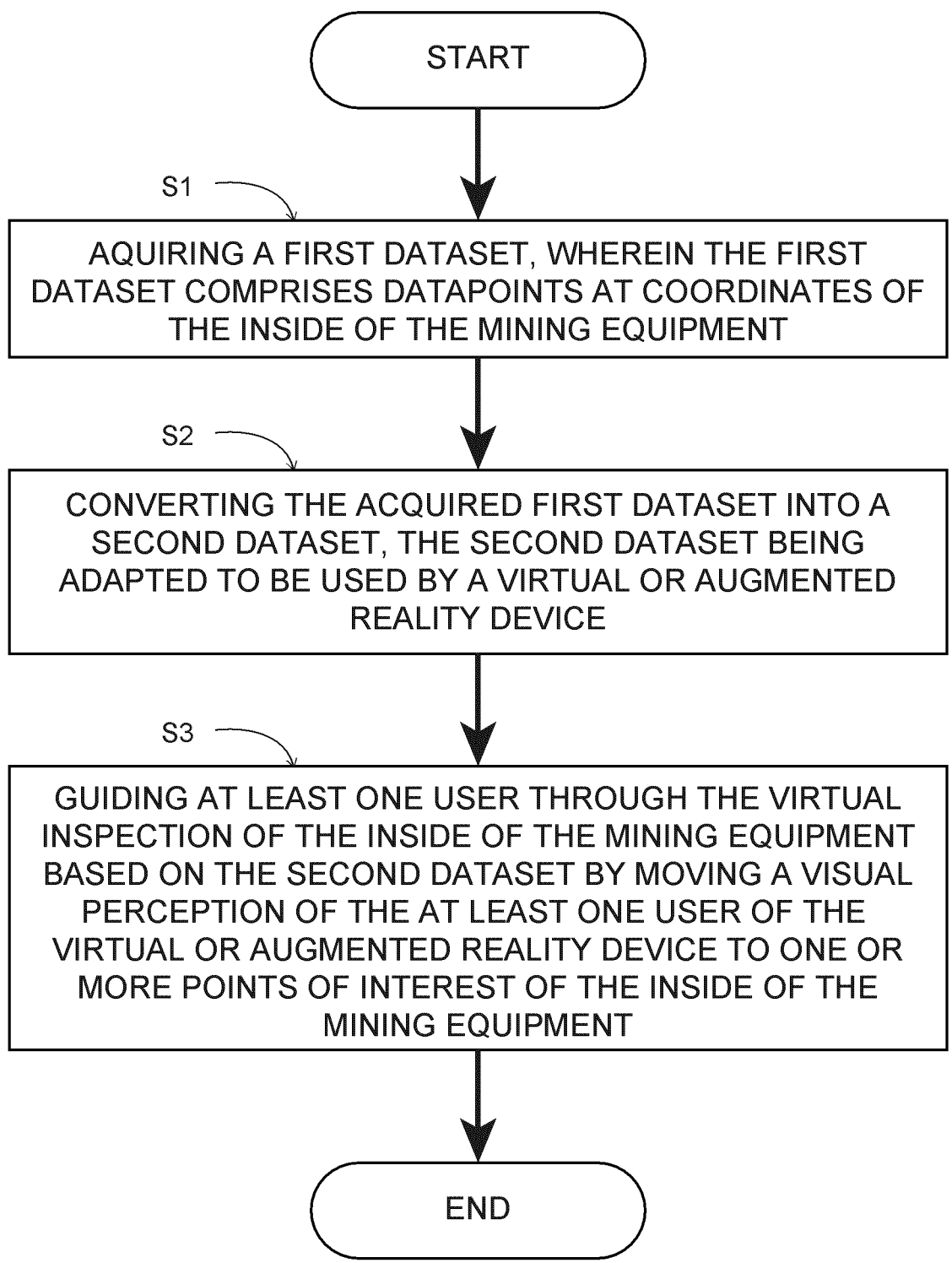
FIG. 6 depicts the computer-implemented method for a virtual inspection of an inside of mining equipment.

According to another embodiment, a computer-implemented method according to FIG. 6 is provided for a virtual inspection of an inside of a mining equipment (as described above). Virtual inspection refers to a method and technology for maintaining, examining, testing, supervising, failure recognizing, providing guidance with regard to the inside of the mining equipment from one or more places outside the mining equipment by use of a virtual reality technology, also referred to as augmented reality (AR) or virtual reality (VR) kit worn by the staff above, such as VR headsets or head-mounted devices such as the Oculus Rift, or VR glasses or VR helmets, that may provide a stereoscopic display to a user. This kind of analysis may be performed during or following step S20 in FIG. 8 or step S107 in FIG. 10.

According to a first step (S1) of the computer-implemented method according to FIG. 6, a first dataset (point-cloud data as described above) is acquired. The first dataset comprises, as described above, datapoints of coordinates of the inside of the mining equipment, such as a mill such as a horizontal or vertical mill, a crusher, a grinder, or a mining equipment as described above. The datapoints preferably define, in a three-dimensional space, the inside of the mining equipment, e.g. geometric shapes, surfaces, directions, orientations, alignments or the like defining the physical appearance of the inside of the mining equipment. The datapoints may also include datapoints of a liner being installed on respective surfaces of the mining equipment to protect the mining equipment from excessive wear. The datapoints may further comprise information regarding a reflection property from the scanned points of the mining equipment (e.g. an intensity of reflection of the sensor's laser light from a surface texture or a surface composition at the respective points of the mining equipment), i.e. a reflection property of the material forming the surface of the mining equipment.

Preferably, the first dataset may be acquired using one or more sensors, for example a sensor 30 described above, a three-dimensional scanning device, a mobile scanning device such as a mobile or flying drone or a robotic suspension device as described above, or from another source. The first dataset may also include datapoints of the specified manufacturing dataset, i.e. the definition of the inside of the mining equipment as it was originally manufactured or planned to be manufactured, e.g. as defined by a CAD dataset or the like. The skilled person understands that any of these exemplary datasets may be acquired by inputting the datasets into a computing device, such as a laptop, a computer workstation, a cloud computer, a computer data server or the like.

According to a second step (S2) of the computer-implemented method of FIG. 6, the acquired first dataset is subsequently converted into a second dataset that is adapted (e.g. has a format suitable) to be used by a virtual or augmented reality device, such as the VR headset, VR glasses, VR helmet or other head-mounted VR device as explained above. The skilled person understands that this conversion mechanism generates a virtual (software-based) geometry dataset to be used by the virtual or augmented reality device so that the user of the virtual or augmented reality device is provided with the impression, i.e. has the visual perception, of looking into or at the interior of the mining equipment. In other words, the wearer of the virtual or augmented reality device is provided with a three-dimensional virtual reality view of the inside of the mining equipment, is able to virtually look or move around the inside of the mining equipment by a movement of the virtual or augmented reality device or an external input device to the virtual or augmented reality device in order to inspect the inside of the mining equipment. Further, a shading or color-coordination of the virtual reality view based on the reflectivity information of the datapoints may be implemented to better illustrate, which part of the mining equipment is constituted by which material/s. For example, each pixel of the second dataset may be provided with a 3D information defining the points in space related to the mining equipment as well as a color or shade value related to the reflectivity information. This improves the visual perception when virtually inspecting the mining equipment.

Such an external input device may be an external motion controller (such as a joystick), a haptic input controller, recorded movement and rotation of the head-mounted device or the like.

Here, the above conversion step, which may also be considered as a post-processing step of the acquired first dataset, may automatically include a check as to whether all required or relevant (e.g. for the purpose of the virtual inspection) datapoints of the inside of mining equipment have actually been acquired. Such a check may be performed with regard to the identification of in/sufficient data, as described above. That is, the conversion may be combined with the point-cloud data acquisition method described above. In other words, based on the known physical geometry of the mining equipment as manufactured, for example, the post-processing may already identify missing datapoints and thus request to provide these missing datapoints, for example by requesting the sensor, three-dimensional scanning device, mobile scanning device or robotic suspension device to acquire the missing datapoints. This avoids a delay in providing the virtual inspection to the users.

According to a third step (S3) of the computer-implemented method of FIG. 6, one or more users are guided through the virtual inspection of the inside of the mining equipment based on the second dataset by moving a visual perception of the user(s) to one or more points of interest (POIs), also referred to as regions of interest above, of the inside of the mining equipment.

Here, POIs of the inside of the mining equipment may refer to specific sites of the inside of the mining equipment that are critical wear areas, areas that are specifically prone to wear, specific areas of the liner, areas that have already been inspected in the past and for which the user wishes to gain an update information as to a current wear state before making a replacement decision or the like.

The movement of the visual perception of the user may be achieved in such a way that the user operates the virtual or augmented reality device or an external input device to the virtual or augmented reality device so that a user has the visual impression of moving or looking around in the interior environment of the mining equipment and specifically looking at or hovering over different POIs.

The multiple users may also be presented in the virtual or augmented reality as respective virtual representatives (an avatar or the like). The virtual representatives may follow inputs from the users to move around the interior of the mining equipment, e.g. by following changes in the visual perception. This provides an improved capability to recognize whether other users are looking at and/or moving towards other parts of the mining equipment.

The second dataset may additionally include data specifying the POIs so that the generated VR environment for the virtual inspection already includes pointers to the POIs in the visual perception. That is, the second dataset may identify areas of the POIs that should be highlighted for the visual perception akin to the highlighting of an identified region 550* outlined above. Such an identification may be achieved, for example, by adding flags or markers to the POIs defined within the second dataset and also by a definition as to how the pointers should be generated within the VR environment, e.g. a shape of the pointers, a color of the pointers, an orientation of the pointers or the like.

When multiple users have entered the virtual or augmented reality, a change in appearance of part of the mining equipment displayed within the virtual reality may be triggered e.g. by use of a virtual flashlight to allow individual users to quickly point to and make the other users aware of further (possibly unmarked) POIs. The user(s) may then be guided through the virtual inspection by following the pointers provided for the virtual perception. The user(s) may then quickly inspect critical areas of the mining equipment, e.g. areas that are of specific concern with regard to excessive wear.

In addition, the user may move the visual perception to other areas of the interior of the mining equipment that are identified by the user. For example, by virtual inspection of the inside of the mining equipment the user may use the external input device to the virtual or augmented reality device to add pointers to the second dataset. The skilled person understands that these added pointers identify three-dimension positions of specific areas in the VR environment that should be highlighted in a specific way (specific color, a specific sign, or the like). Such additional pointers may, for example, be provided for such areas for which an initial wearing process is identified by the user (e.g. by observing new cracks or the like) and should be monitored more closely in the future or should be looked at more closely by other users (e.g. remote users) that are simultaneously guided through the virtual inspection.

In addition, by using the external input device to the virtual or augmented reality device, the user may further input text information (notes or the like), image data, audio or voice data in connection with the identification of specific sites or areas of the inside of the mining equipment. The skilled person understands that these added data (e.g. text, image, audio, voice data or the like) may be augmented for the perception of the users when virtually inspecting the inside of the mining equipment. Such added data may thus be inputted to enhance the virtual inspection capabilities.

Such additional data may also be inputted or recorded during the virtual inspection. In particular, a plurality of users (for example on-site and off-site/remote users) may input different additional data during the virtual inspection with regard to specific POIs.

These added data, which may be added to the second dataset and thus augmented into the visual perception may also include ID tags with regard to specific parts of the mining equipment, parts numbers, information with regard to installation dates, batch information as to when a part has been produced or replaced, stock levels or order status of specific parts, weight information of the parts, or the like. In addition, such augmented additional parameter information may include information as to tests performed with regard to specific parts of the mining equipment, i.e. about test dates, test parameters, and the like.

According to another embodiment, the virtual inspection of the inside of the mining equipment may be coordinated between two or more users. Here, by using a motion tracking mechanism for a first user, for example using a head motion tracking sensor (e.g. using an accelerometer, a gyroscope, or the like) and thus identifying a virtual path of the first user in the virtual perception of the virtual inspection of the inside of the mining equipment, e.g. moving from a first POI to a second POI, for example in the context of following the propagation of specific cracks in the liner or other forms of wear as described above, the same virtual path is also provided at the virtual or augmented reality device of the second user.

In other words, by coordinating the virtual inspection for the users, the users are provided with the same visual perception of the inside of the mining equipment, i.e. they look at the same POIs at the same time. This allows one user to guide other users through the virtual inspection of the mining equipment and also to augment the visual perception of the other users by pointing at specific POIs, adding additional text, image, audio, voice data, as explained above.

The skilled person understands that this coordination mechanism may be implemented in such a way that the motion tracking sensor input with regard to the virtual or augmented reality device of a first user is also used at the virtual or augmented reality device of the other users. This may be achieved in such a way that the virtual or augmented reality devices communicate with each other. For example, a first virtual or augmented reality device transmits the motion tracking sensor input data (which are received at this device) to the other virtual or augmented reality devices via a wired or wireless connection so that the other virtual or augmented reality devices access the second dataset according to these motion tracking sensor input data.

The skilled person further understands that the coordination between the two users may equally be applied when the first user performs the scanning/acquiring of the first dataset and the second user performs a live inspection. Thereby, missing or insufficient data may be indicated with a POI by the second user, guiding the first user towards the POI to acquire further data. Simultaneously, the inspection on regions of the mining equipment represented by sufficient data may already take place.

According to another embodiment, the second dataset (as explained above) may be transferred to one or more remote users. Remote (or off-site) users may, for example, be users that are not present at the actual geographical location of the mining equipment. The second dataset may thus be generated on-site, e.g. when acquiring the first dataset by using a 3D scan, sensors, and/or mobile devices for the mining equipment, and subsequently be shared with other remote users. The virtual inspection, as explained here, may thus be remotely performed, so that the technical experts and engineers do not have to be physically present.

According to another embodiment, the virtual inspection may be further improved by acquiring additional datapoints of the first dataset of the inside of the mining equipment based on a first virtual inspection of one or more points of interest of the inside of the mining equipment. This defines a feedback mechanism, advantageously initiated by a remote user, to acquire additional information with regard to the actual inside of the mining equipment, e.g. geometric shapes, surfaces, directions, orientations, alignments or the like defining the physical appearance of the inside of the mining equipment. This feedback mechanism may, for example, be applied if the virtual inspection identifies a potential wear area of the inside of the mining equipment which requires more detailed investigation for which data of higher (spatial) resolution are necessary. This feedback mechanism may also be applied if the virtual inspection identifies specific areas for which the actual physical appearance (as acquired by the first dataset) should be acquired differently, for example if a sensor should perform a measurement from a different angle because of a shadow or the like, as described above. The skilled person understands that subsequent to the acquisition of the additional datapoints, the conversion to the second dataset may be provided for the additional datapoints of the first dataset and thus the user may be provided with a visual feedback of the additional datapoints in the visual perception when performing the virtual inspection. In other words, the updated virtual inspection may readily indicate whether sufficient additional datapoints (of higher spatial resolution or the like) have been acquired.

According to another embodiment, the first dataset (as described above) may be acquired at different points in time, for example over the course of the lifetime of the mining equipment, over the course of one month, or one year. Defining the first dataset as DS1, the first dataset may thus be acquired at different times t, for example at three points in time, i.e. $DS1(t1)$, $DS1(t2)$, and $DS1(t3)$. As such, physical parameters of the actual inside of the mining equipment, e.g. geometric shapes, surfaces, directions, orientations, alignments or the like defining the physical appearance of the inside of the mining equipment over time, are acquired. In addition, the first dataset at these different points in time is converted into a plurality of the second dataset DS2, i.e. $DS2(t1)$, $DS2(t2)$, and $DS2(t3)$ in this example.

Based thereon, the virtual inspection of the inside of the mining equipment may be provided in such a way that the development of a physical parameter and/or a simulation of a physical parameter at one or more of the points of interests are augmented into the visual perception. More specifically, based the change of the datasets over multiple points of time and when and where POIs have been identified, an artificial intelligence (AI) may be trained to classify at what degree or pattern of change of the datasets, a POI is likely to occur. Consequently, a first estimate of POIs may be provided during the scanning, but without the need of a second user to provide input on possible further POIs.

For example, with regard to one or more specific points of interest, a temporal wear profile or a temporal trend profile with regard to a dimensionality of the liner, a heat-map or the like, may be determined and provided in the virtual inspection when the user moves to the specific point of interest. The virtual inspection may thus be provided in a way that the current state of the inside of the mining equipment may be virtually inspected together with a real-time visual perception of the temporal development of specific POIs inside of the mining equipment over time. This may be enhanced also by a comparison with the original design of the specific POIs (e.g. using a CAD model comparison, alternative designs or the like).

A simulation of a physical parameter may be conducted on the basis of the known development of a physical parameter, e.g. the measured dimensionality of the liner, cross-sections of the liner or the like, and by applying a simulation algorithm that predicts the further development of the physical parameter. For example, determining a time constant that identifies how the physical parameter (thickness of the liner at some POI, or the like) has been reduced over time, a simulation algorithm may be applied to predict how the physical parameter will likely develop. The skilled person understands that this provides an improved mechanism to inform the user about a predicted time at which specific parts of the mining equipment need to be replaced. This improves the coordination of down-times of the mining equipment which takes a comparatively long time and leads to significant operation costs.

In addition, the second dataset may also be augmented with additional physical parameter information with regard to the one or more POIs of the inside of the mining equipment. This additional physical parameter information may, for example be a video clip how the parts of the mining equipment look or behave in real operating situation, i.e. when milling, crushing or grinding minerals or ore. This may also include additional simulations as to charge motion, material flow, grinding, size reduction or the like, which provides the user with additional insight as to the distribution of shear, impact, power draw or the like throughout the inside of the mining equipment and thus the life span of the mining equipment. This additional physical parameter information may also include a comparison of the current state of the liner with the original liner design.

The virtual inspection may be additionally enhanced by providing a virtual measuring device or virtual tape measure. The virtual measuring device may be used by the user to determine a dimensionality with the VR environment provided in the visual perception of the user. For example, a user is capable to place the virtual measuring tape along an identified crack (or other forms of wear as described above)

at the inside of the mining equipment and to specify the dimensionality (e.g. a length) of the crack. The computing device then processes the specified dimensionality data (in the virtual space defined by the second dataset) and performs a conversion into a real space dimensionality as defined by the first dataset. As such, the user may be provided with a direct feedback as to the actual dimension of a newly identified crack at the inside of the mining equipment.

Further, the virtual inspection may be additionally enhanced by providing a virtual cross-section analyzer that displays a cross-section or contour of a surface of the mining equipment. For example, a user is capable of drawing or projecting a line onto the surface of the mining equipment and the protrusions or recesses identified at this line may be displayed as a diagram within the virtual view of the VR environment. Thereby, deformations of or damage to the surface of the mining equipment become easily identifiable.

Figure 7:
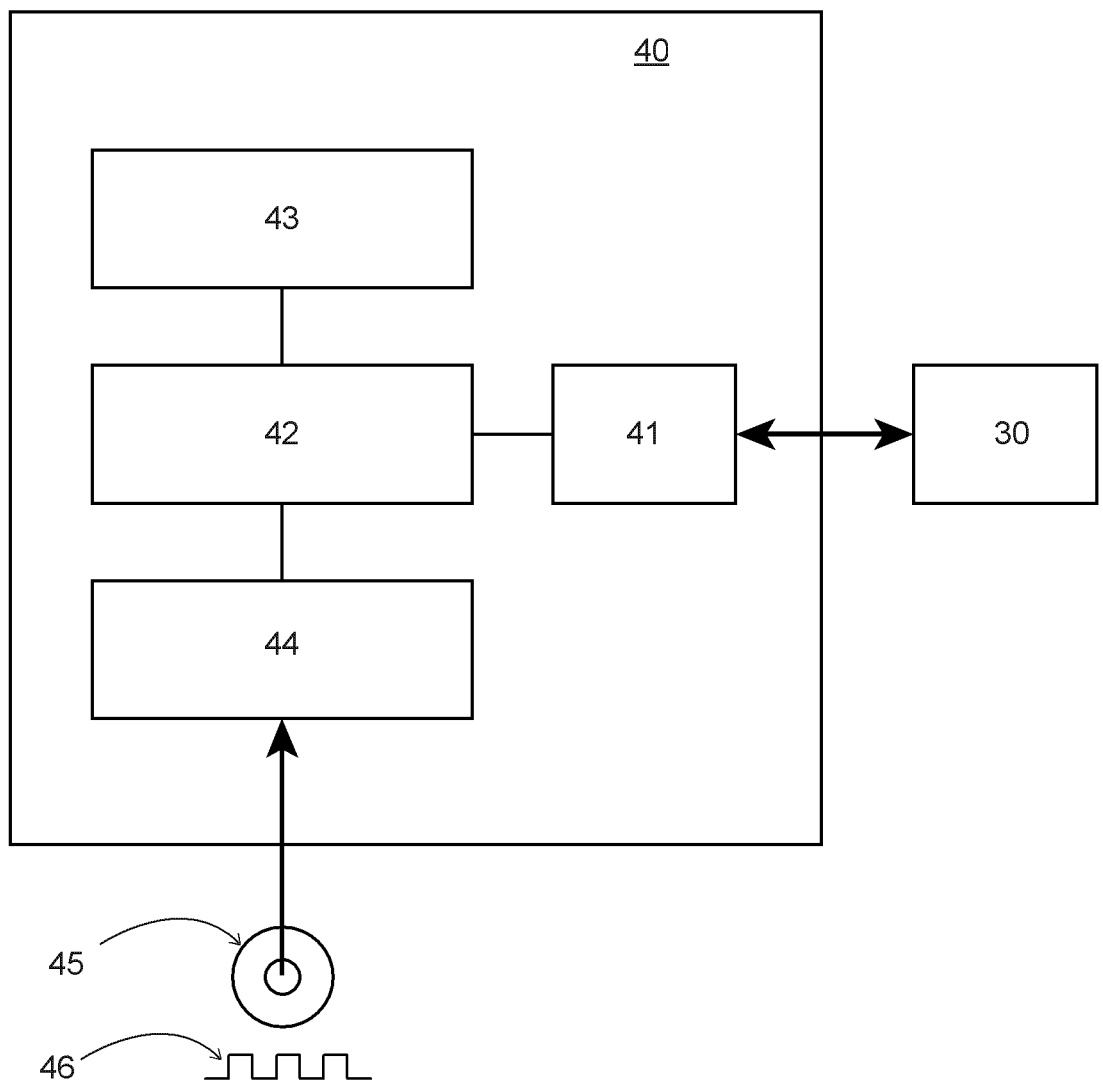
FIG. 7 is a block diagram illustrating an example hardware configuration of a computing device to implement the methods described herein.

FIG. 7 is a schematic illustration of a computing device 40, which may, as in the above embodiments, be configured to implement the computer-implemented methods described above and defined in the claims, and thus operate as a mining equipment inspection device. The computing device 40, which may also be referred to as programmable signal processing hardware 40 comprises a communication interface (I/F) 41 for, in embodiments such as the present embodiments, acquiring mining equipment data from a sensor 30, scanner or mobile device, as described above. The computing device 40 further comprises a processor (e.g. a Central Processing Unit, CPU, or Graphics Processing Unit, GPU) 42, a working memory 43 (e.g. a random access memory) and an instruction store 44 storing a computer program comprising the computer-readable instructions which, when executed by the processor 42, cause the processor 42 to perform various functions including those defined in the computer-implemented methods described above and defined in the claims. The instruction store 44 may comprise a ROM (e.g. in the form of an electrically-erasable programmable read-only memory (EEPROM) or flash memory) which is pre-loaded with the computer-readable instructions. Alternatively, the instruction store 44 may comprise a RAM or similar type of memory, and the computer-readable instructions of the computer program can be input thereto from a computer program product, such as a non-transitory, computer-readable storage medium 45 in the form of a CD-ROM, DVD-ROM, etc. or a computer-readable signal 46 carrying the computer-readable instructions. In any case, the computer program, when executed by the processor, causes the processor to execute at least one of the computer-implemented methods for point-cloud data acquisition, inspecting the inside surface of an operating mining equipment, and virtual inspection of an inside of the mining equipment as described herein. It should be noted, however, that the device 40 may alternatively be implemented in non-programmable hardware, such as an application-specific integrated circuit (ASIC).

It will be apparent to those skilled in the art that various modifications and variations can be made in the entities and methods of this invention as well as in the construction of this invention without departing from the scope of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

The following is provided in accordance with aspects of the present disclosure:

A1. A computer-implemented point-cloud data acquisitioning method for acquiring point-cloud data of the mining equipment, preferably of the inside or a region of a mining equipment, the method comprising:
acquiring from a sensor, a first dataset and a second dataset, wherein each dataset comprises datapoints at coordinates;
extracting features from the first and second dataset;
aligning the first and second dataset using the extracted features;
combining the aligned first and second dataset into a point-cloud data.

A2. The computer-implemented point-cloud data acquisitioning method of A1, wherein the features include structural features of the mining equipment and/or reflection property features of the mining equipment.

A3. The computer-implemented point-cloud data acquisitioning method of any of A1-A2, further comprising:
estimating a geometry of the mining equipment based on the point-cloud data.

A4. The computer-implemented point-cloud data acquisitioning method of any of A1-A3, further comprising:
using the point-cloud data by a virtual or augmented reality device to provide a visual perception of the mining equipment.

A5. The computer-implemented point-cloud data acquisitioning method of any of A1-A4, further comprising:
identifying by use of the point-cloud data a region of the estimated geometry indicating insufficient data.

A6. The computer-implemented point-cloud data acquisitioning method according to any of A1-A5, wherein
if an area of the identified region is above a predetermined area,
a next coordinate is extracted from within the identified area, wherein the next coordinate is preferably a coordinate closest to a scanning direction of the sensor, and
the sensor is caused to move in a direction towards the next coordinate until the next coordinate falls inside a scanning range of the sensor, or
a user is notified of the next coordinate and instructed to move the sensor in a direction towards the next coordinate until the next coordinate falls inside the scanning range of the sensor.

A7. The computer-implemented point-cloud data acquisitioning method according to A6, wherein
if the next coordinate falls inside the scanning range of the sensor, the method further comprises:
acquiring from the sensor, a third dataset comprising datapoints at coordinates;
extracting features from the point-cloud data and the third dataset;
aligning the third dataset to the point-cloud data;
combining the aligned third dataset into the point-cloud data;
re-estimating the geometry of the mining equipment as the estimated geometry based on the point-cloud;
re-identifying by use of the point-cloud data a region of the estimated geometry indicating insufficient data as the region indicating insufficient data.

A8. The computer-implemented point-cloud data acquisitioning method according to any one of A1 to A7, wherein
if an area of the identified region is below a predetermined area, a fault analysis based on the point-cloud data is performed.

A9. The computer-implemented point-cloud data acquisitioning method according to any one of A1 to A8, wherein
the sensor is a movable sensor, preferably handheld, flying or suspended.

A10. The computer-implemented point-cloud data acquisitioning method according to any one of A1 to A9, wherein
the sensor is a depth sensor, sensing the distance from the sensor to a surface as depth.

A11. The computer-implemented point-cloud data acquisitioning method according to any one of A1 to A10, wherein
the sensor senses information about a distance from the sensor to a surface of the mining equipment, preferably of the inside or the region of the mining equipment as depth information.

A12. The computer-implemented point-cloud data acquisitioning method according to any one of A1 to A11, wherein
the sensor senses information about an intensity-related property of the reflected and measured signal.

A13. The computer-implemented point-cloud data acquisitioning method according to any one of A1 to A12, wherein
the second dataset is acquired after the first dataset and after the sensor has been moved.

A14. The computer-implemented point-cloud data acquisitioning method according to any one of A1 to A13, wherein
the sensor obtains information about orientation and/or odometry of the sensor.

A15. The computer-implemented point-cloud data acquisitioning method according to any one of A1 to A14, wherein
the information about orientation includes roll, pitch and/or yaw information of the sensor; and
the information about odometry includes x, y and z information of the sensor.

A16. The computer-implemented point-cloud data acquisitioning method according to any one of A1 to A15, wherein
the datapoints are coordinates indicating a location of a surface sensed by the sensor.

A17. The computer-implemented point-cloud data acquisitioning method according to any one of A1 to A16, wherein
the features are extracted by use of one of feature detection, edge detection, line tracing or spline fitting over a surface represented by the datapoints.

A18. The computer-implemented point-cloud data acquisitioning method according to any one of A1 to A17, wherein
the extracting extracts principle components of the features for the aligning.

A19. The computer-implemented point-cloud data acquisitioning method according to any one of A1 to A8, wherein
the aligning comprises linearly transforming, preferably rotating, scaling and/or translating the first, second and/or third dataset to maximize alignment and/or match.

A20. The computer-implemented point-cloud data acquisitioning method according to A19, wherein
the alignment between the first, second and/or third dataset and/or point-cloud data is indicated by a dot product of the features, preferably the principle components.

A21. The computer-implemented point-cloud data acquisitioning method according to A19 or A20, wherein
the alignment of the first, second and/or third dataset and/or point-cloud data is indicated by convolution and/or correlation of the features, preferably the principle component.

A22. The computer-implemented point-cloud data acquisitioning method according to any one of A1 to A21, wherein
the point-cloud data is meshed before estimating the geometry of the mining equipment.

B1. A computer-implemented inspection method for inspecting the surface of an operating mining equipment, the method comprising:
moving a sensor through the inside or along of the mining equipment;
acquiring by use of the sensor, first point-cloud data and second point-cloud data, wherein the point-cloud data represent a surface inside or along the mining equipment;
determining based on each the first and second point-cloud data, surfaces inside or along the mining equipment;
estimating based on the determined surfaces, a geometry of the mining equipment, preferably an inside geometry of the mining equipment.

B2. The computer-implemented inspection method according to B1, wherein
the mining equipment is rotating or moving during the acquiring.

B3. The computer-implemented inspection method according to B1 or B2, wherein
the sensor rotates in a direction opposite to a rotation direction of the mining equipment.

B4. The computer-implemented inspection method according to any one of B1-B3, wherein
the sensor rotates at an angular velocity faster than an angular velocity of the mining equipment.

B5. The computer-implemented inspection method according to any one of B1 to B4, wherein
the mining equipment rotates at an angular velocity equal to or lower than an angular velocity during normal operation.

B6. The computer-implemented inspection method according to any one of B1 to B5, wherein
the first point-cloud data and the second point-cloud data are acquired according to the method of any one of A1 to A22.

B7. The computer-implemented inspection method according to any one of B1 to B6, wherein
the sensor is moved essentially parallel to a rotating axis of the mining equipment.

B8. The computer-implemented inspection method according to any one of B1 to B7, wherein
the mining equipment rotates around its rotating axis when operated.

B9. The computer-implemented inspection method according to any one of B1 to B8, wherein
the second point-cloud data is acquired after the first point-cloud data and after the sensor and/or the mining equipment have/has moved.

B10. The computer-implemented inspection method according to any one of B1 to B9, wherein
the acquired first and second point-cloud data are corrected in rotation based on the rotation angles of the sensor and the mining equipment.

C1. A human-machine guidance system for inspecting a mining equipment, preferably an inside or a region of the mining equipment, the system comprising:

a display;

a sensor configured to sense a distance to a surface of the mining equipment;

a tracker configured to track location and orientation of the sensor;

a point-cloud generator configured to generate point-cloud data based on the sensed distance and the tracked location and orientation of the sensor;

a surface estimator configured to estimate a surface based on the point-cloud data; and a geometry estimator configured to estimate a geometry of the mining equipment based on the surface.

C2. The human-machine guidance system according to C1, wherein the display is configured to display the estimated surface based on location and orientation of the sensor.

C3. The human-machine guidance system according to any of C1 to C2, wherein the tracker is further configured to track location and/or orientation of the display; and the display is configured to display the estimated surface based on location and/or orientation of the display.

C4. The human-machine guidance system according to any of C1 to C3, wherein the sensor is further configured to sense a reflection property of the mining equipment.

C5. The human-machine guidance system according to any of C1 to C4, wherein the sensor is further configured to sense an intensity-related property of the reflected and measured signal.

C6. The human-machine guidance system according to any of C1 to C5, further comprising:

a mining equipment database configured to store a template geometry and a region of interest of the mining equipment;

a sub-cloud determiner configured to extract from the point-cloud data a subset as a sub-cloud data based on the region of interest; and a data transceiver configured to transmit the sub-cloud data to a remote display.

C7. The human-machine guidance system according to any of C1 to C6, wherein:

if the point-cloud data does not comprise datapoints at the region of interest, the estimated surface and/or geometry are/is highlighted at a location of the region of interest.

C8. The human-machine guidance system according to any of C1 to C7, further comprising:

a remote computer, preferably co-located with the remote display, configured to:

receive inputs to define another region of interest, and store the region of interest in the mining equipment database.

C9. The human-machine guidance system according to any of C1 to C8, further comprising:

a hole detector configured to detect coordinates on the estimated geometry for which the number of datapoints of the point-cloud is below a predetermined value, or the surface gradient is above a predetermined value.

C10. The human-machine guidance system according to any one of C1 to C9, wherein the display is a virtual or augmented reality display.

D1. A computer-implemented method for a virtual inspection of a mining equipment, preferably an inside or a region of the mining equipment, the method comprising:

acquiring a first dataset, wherein the first dataset comprises datapoints at coordinates of the mining equipment;

converting the acquired first dataset into a second dataset, the second dataset being adapted to be used by a virtual or augmented reality device;

guiding at least one user through the virtual inspection of the mining equipment based on the second dataset by moving a visual perception of the at least one user of the virtual or augmented reality device to one or more points of interest of the mining equipment.

D2. The computer-implemented method of D1, wherein the first dataset further comprises a reflection property of the mining equipment at the coordinates of the mining equipment.

D3. The computer-implemented method according to any of D1 to D2, wherein the first dataset further comprises an intensity-related property of the reflected and measured signal at the coordinates of the mining equipment.

D4. The computer-implemented method according to any of D1-D3, further comprising:

coordinating the virtual inspection between at least two users.

D5. The computer-implemented method according to any of D1-D4, further comprising:

transferring the second dataset to one or more remote users.

D6. The computer-implemented method according to any of D1-D5, further comprising:

acquiring additional datapoints of the first dataset of the mining equipment based on a first virtual inspection of one or more points of interest of the mining equipment.

D7. The computer-implemented method according to any of D1-D6, further comprising:

acquiring a plurality of the first dataset at different points in time;

converting the acquired plurality of the first dataset into a plurality of the second dataset, providing the virtual inspection of the mining equipment based on the plurality of the second dataset, wherein the virtual inspection provides a physical parameter development and/or a physical parameter simulation and/or a cross-section and/or or a contour at the one or more points of interest of the mining equipment.

D8. The computer-implemented method according to any of D1-D7, further comprising:

augmenting the second dataset with additional physical parameter information with regard to the one or more points of interest of the mining equipment.

D9. The computer-implemented method according to any of D1-D7, further comprising:

using a virtual flashlight in the visual perception.

E1. A computer program which, when executed by a computer (40), causes the computer to perform the method according to any of A1 to A22 or B1 to B10 or D1 to D9.

E2. A non-transitory computer-readable storage medium (45) storing a computer program in accordance with E1.

E3. A signal (46) carrying a computer program in accordance with E1.

The invention claimed is:

1. A computer-implemented point-cloud data acquisitioning method for acquiring point-cloud data of the inside of a mining equipment, the method comprising:

acquiring from a sensor, a first dataset and a second dataset, wherein each dataset comprises datapoints at coordinates;

extracting features from the first and second dataset;

aligning the first and second dataset using the extracted features;
combining the aligned first and second dataset into a point-cloud data;
estimating a geometry of the mining equipment based on the point-cloud data;
identifying by use of the point-cloud data a region of the estimated geometry indicating insufficient data.

2. The computer-implemented point-cloud data acquisitioning method according to claim 1, wherein
if an area of the identified region is above a predetermined area,
a next coordinate is extracted from within the identified area, wherein the next coordinate is a coordinate closest to a scanning direction of the sensor, and
the sensor is caused to move in a direction towards the next coordinate until the next coordinate falls inside a scanning range of the sensor, or
a user is notified of the next coordinate and instructed to move the sensor in a direction towards the next coordinate until the next coordinate falls inside the scanning range of the sensor.

3. The computer-implemented point-cloud data acquisitioning method according to claim 2, wherein
if the next coordinate falls inside the scanning range of the sensor, the method further comprises:
acquiring from the sensor, a third dataset comprising datapoints at coordinates;
extracting features from the point-cloud data and the third dataset;
aligning the third dataset to the point-cloud data;
combining the aligned third dataset into the point-cloud data;
re-estimating the geometry of the mining equipment as the estimated geometry based on the point-cloud;
re-identifying by use of the point-cloud data a region of the estimated geometry indicating insufficient data as the region indicating insufficient data.

4. The computer-implemented point-cloud data acquisitioning method according to claim 1, wherein
if an area of the identified region is below a predetermined area, a fault analysis based on the point-cloud data is performed.

5. The computer-implemented point-cloud data acquisitioning method according to claim 1, wherein
the sensor is a movable sensor, preferably handheld, flying or suspended.

6. The computer-implemented point-cloud data acquisitioning method according to claim 1, wherein
the sensor is a depth sensor, sensing the distance from the sensor to a surface as depth.

7. The computer-implemented point-cloud data acquisitioning method according to claim 1, wherein
the sensor senses information about a distance from the sensor to a surface inside the mining equipment as depth information.

8. The computer-implemented point-cloud data acquisitioning method according to claim 1, wherein
the second dataset is acquired after the first dataset and after the sensor has been moved.

9. The computer-implemented point-cloud data acquisitioning method according to claim 1, wherein
the sensor obtains information about orientation and/or odometry of the sensor.

10. The computer-implemented point-cloud data acquisitioning method according to claim 1, wherein the information about orientation includes roll, pitch and/or yaw information of the sensor; and
the information about odometry includes x, y and z information of the sensor.

11. The computer-implemented point-cloud data acquisitioning method according to claim 1, wherein
the datapoints are coordinates indicating a location of a surface sensed by the sensor.

12. The computer-implemented point-cloud data acquisitioning method according to claim 1, wherein
the features are extracted by use of one of feature detection, edge detection, line tracing or spline fitting over a surface represented by the datapoints.

13. The computer-implemented point-cloud data acquisitioning method according to claim 1, wherein
the extracting extracts principle components of the features for the aligning.

14. The computer-implemented point-cloud data acquisitioning method according to claim 1, wherein
the aligning comprises linearly transforming, preferably rotating, scaling and/or translating the first, second and/or third dataset to maximize alignment and/or match.

15. The computer-implemented point-cloud data acquisitioning method according to claim 14, wherein
the alignment between the first, second and/or third dataset and/or point-cloud data is indicated by a dot product of the features, preferably the principle components.

16. The computer-implemented point-cloud data acquisitioning method according to claim 14, wherein
the alignment of the first, second and/or third dataset and/or point-cloud data is indicated by convolution and/or correlation of the features, preferably the principle component.

17. The computer-implemented point-cloud data acquisitioning method according to claim 1, wherein
the point-cloud data is meshed before estimating the geometry of the mining equipment.

18. A computer-implemented inspection method for inspecting the inside surface of an operating mining equipment that is performing its mining operation on mining material, the method comprising:
moving a sensor through the inside of the mining equipment;
acquiring by use of the sensor, first point-cloud data and second point-cloud data, wherein the point-cloud data represent a surface inside the mining equipment;
determining based on each the first and second point-cloud data, surfaces inside the mining equipment;
estimating based on the determined surfaces, an inside geometry of the mining equipment.

19. The computer-implemented inspection method according to claim 18, wherein
the mining equipment is rotating during the acquiring.

20. The computer-implemented inspection method according to claim 18, wherein
the sensor rotates in a direction opposite to a rotation direction of the mining equipment.

21. The computer-implemented inspection method according to claim 18, wherein
the sensor rotates at an angular velocity faster than an angular velocity of the mining equipment.

22. The computer-implemented inspection method according to claim 18, wherein
the mining equipment rotates at an angular velocity equal to or lower than an angular velocity during normal operation.

23. The computer-implemented inspection method according to claim 18, wherein
the first point-cloud data and the second point-cloud data are acquired according to the method of claim 1.

24. The computer-implemented inspection method according to claim 18, wherein
the sensor is moved essentially parallel to a rotating axis of the mining equipment.

25. The computer-implemented inspection method according to claim 18, wherein
the mining equipment rotates around its rotating axis when operated.

26. The computer-implemented inspection method according to claim 18, wherein
the second point-cloud data is acquired after the first point-cloud data and after the sensor and/or the mining equipment have/has moved.

27. The computer-implemented inspection method according to claim 18, wherein
the acquired first and second point-cloud data are corrected in rotation based on the rotation angles of the sensor and the mining equipment.

28. A computer-implemented method for a virtual inspection of an inside of a mining equipment, the method comprising:
acquiring a first dataset, wherein the first dataset comprises datapoints at coordinates of the inside of the mining equipment;
converting the acquired first dataset into a second dataset, the second dataset being adapted to be used by a virtual or augmented reality device;
guiding at least one user through the virtual inspection of the inside of the mining equipment based on the second dataset by moving a visual perception of the at least one user of the virtual or augmented reality device to one or more points of interest of the inside of the mining equipment.

29. The computer-implemented method of claim 28, further comprising:
coordinating the virtual inspection between at least two users.

30. The computer-implemented method of claim 28, further comprising:
transferring the second dataset to one or more remote users.

31. The computer-implemented method of claim 28, further comprising:
acquiring additional datapoints of the first dataset of the inside of the mining equipment based on a first virtual inspection of one or more points of interest of the inside of the mining equipment.

32. The computer-implemented method of claim 28, further comprising:
acquiring a plurality of the first dataset at different points in time;
converting the acquired plurality of the first dataset into a plurality of the second dataset, providing the virtual inspection of the inside of the mining equipment based on the plurality of the second dataset, wherein the virtual inspection provides a physical parameter development and/or a physical parameter simulation at the one or more points of interest of the inside of the mining equipment.

33. The computer-implemented method of claim 28, further comprising:
augmenting the second dataset with additional physical parameter information with regard to the one or more points of interest of the inside of the mining equipment.

34. A non-transitory computer-readable storage medium storing a computer program, which when executed by a computer, causes the computer to perform the method according to claim 1.

* * * * *